(12) United States Patent
Schechter et al.

(10) Patent No.: US 11,593,380 B2
(45) Date of Patent: Feb. 28, 2023

(54) EDITOR FOR GENERATING COMPUTATIONAL GRAPHS

(71) Applicant: Ab Initio Technology LLC, Lexington, MA (US)

(72) Inventors: Ian Schechter, Sharon, MA (US); Garth Dickie, Framingham, MA (US)

(73) Assignee: Ab Initio Technology LLC, Lexington, MA (US)

( * ) Notice: Subject to any disclaimer, the term of this patent is extended or adjusted under 35 U.S.C. 154(b) by 131 days.

(21) Appl. No.: 16/862,821

(22) Filed: Apr. 30, 2020

(65) Prior Publication Data

US 2021/0232579 A1 Jul. 29, 2021

Related U.S. Application Data

(60) Provisional application No. 62/966,768, filed on Jan. 28, 2020.

(51) Int. Cl.
*G06F 16/2455* (2019.01)
*G06F 16/2457* (2019.01)
(Continued)

(52) U.S. Cl.
CPC ........ *G06F 16/2456* (2019.01); *G06F 9/3005* (2013.01); *G06F 9/5061* (2013.01); *G06F 16/244* (2019.01); *G06F 16/24573* (2019.01); *G06F 16/254* (2019.01); *G06F 16/9024* (2019.01)

(58) Field of Classification Search
None
See application file for complete search history.

(56) References Cited

U.S. PATENT DOCUMENTS 5,966,072 A 10/1999 Stanfill et al.
8,069,129 B2 11/2011 Gould et al.
(Continued)

FOREIGN PATENT DOCUMENTS

WO WO 2016/177405 11/2016

OTHER PUBLICATIONS

Giraud-Carrier, "A Reconfigurable Data Flow Machine for Implementing Functional Programming Language", ACM SIGPLAN Notices, vol. 29, No. 9, Sep. 1994, pp. 22-28.*

(Continued)

*Primary Examiner* — Uyen T Le
(74) *Attorney, Agent, or Firm* — Fish & Richardson P.C.

(57) ABSTRACT

Techniques for generating a dataflow graph include generating a first dataflow graph with a plurality of first nodes representing first computer operations in processing data, with at least one of the first computer operations being a declarative operation that specifies one or more characteristics of one or more results of processing of data, and transforming the first dataflow graph into a second dataflow graph for processing data in accordance with the first computer operations, the second dataflow graph including a plurality of second nodes representing second computer operations, with at least one of the second nodes representing one or more imperative operations that implement the logic specified by the declarative operation, where the one or more imperative operations are unrepresented by the first nodes in the first dataflow graph.

78 Claims, 11 Drawing Sheets

(51) Int. Cl.
    *G06F 16/242* (2019.01)
    *G06F 16/25* (2019.01)
    *G06F 16/901* (2019.01)
    *G06F 9/30* (2018.01)
    *G06F 9/50* (2006.01)

(56) References Cited

U.S. PATENT DOCUMENTS

| | | | | |
|---|---|---|---|---|
| 2005/0097561 | A1* | 5/2005 | Schumacher | G06F 8/10 |
| | | | | 712/213 |
| 2008/0052687 | A1* | 2/2008 | Gonzales-Tuchmann | |
| | | | | G06F 8/34 |
| | | | | 717/140 |
| 2010/0241828 | A1* | 9/2010 | Yu | H04L 12/44 |
| | | | | 712/30 |
| 2012/0284255 | A1* | 11/2012 | Schechter | G06F 16/24542 |
| | | | | 707/718 |
| 2016/0117364 | A1* | 4/2016 | Jahankhani | G06F 16/2438 |
| | | | | 707/760 |
| 2017/0277800 | A1* | 9/2017 | Lucas | G06F 9/48 |
| 2019/0130048 | A1 | 5/2019 | Egenolf et al. | |
| 2019/0370407 | A1 | 12/2019 | Dickie | |

OTHER PUBLICATIONS

Smits and Visser, "FlowSpec: Declarative Dataflow Analysis Specification," in Proceedings of 2017 ACM SIGPLAN International Conference on Software Learning Engineering (SLE '17), New York, NY, 11 pages.

PCT International Search Report and Written Opinion in International Appln. No. PCT/US2020/030612, dated Nov. 2, 2020, 14 pages.

* cited by examiner

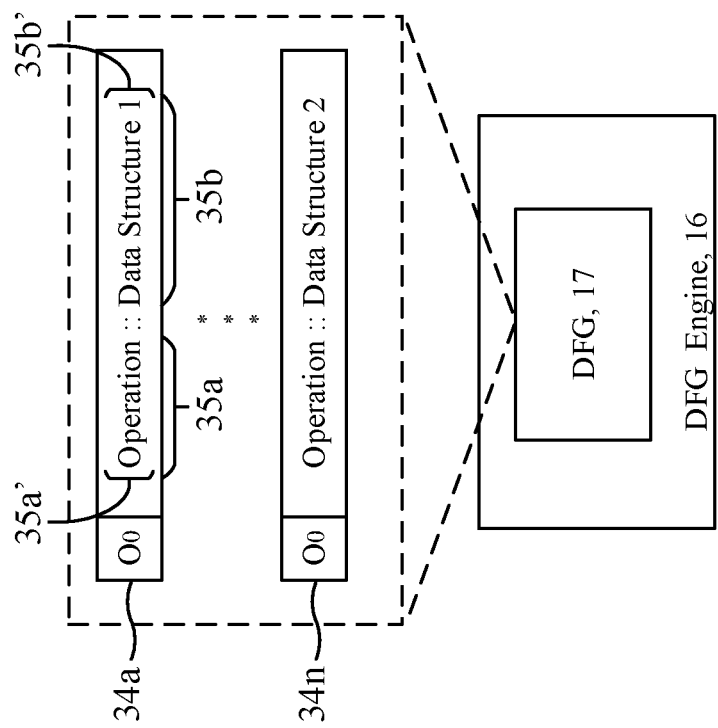

EDITOR FOR GENERATING COMPUTATIONAL GRAPHS

CLAIM OF PRIORITY

This application claims priority to U.S. Provisional Patent Application No. 62/966,768, filed Jan. 28, 2020, the entire contents of which are incorporated herein by reference.

BACKGROUND

This disclosure relates to generating computational graphs.

Complex computations can often be expressed as a data flow through a directed graph, with components of the computation being associated with the vertices of the graph and data flows between the components corresponding to links (arcs, edges) of the graph. A system that implements such graph-based computations is described in U.S. Pat. No. 5,966,072, titled "Executing Computations Expressed as Graphs," the entire contents of which are incorporated herein by reference. In some cases, the computations associated with a vertex is described in human-readable form referred to as "business rules."

One technique for generating data flow graphs uses a business rule editor. An example of a business rule editor is disclosed in U.S. Pat. No. 8,069,129, titled "Editing and Compiling Business Rules," the entire contents of which are incorporated herein by reference.

SUMMARY

In a general aspect 1, a method for transforming a first dataflow graph into a second dataflow graph, where the first dataflow graph includes a plurality of first nodes representing a plurality of first computer operations, where the second dataflow graph includes a plurality of second nodes representing a plurality of second computer operations, and where at least some of the second computer operations are unrepresented by the first nodes in the first dataflow graph, includes: generating the first dataflow graph with the plurality of first nodes representing first computer operations in processing data, with at least one of the first computer operations being a declarative operation that specifies one or more characteristics of one or more results of processing of data, transforming the first dataflow graph into the second dataflow graph for processing data in accordance with the first computer operations, the second dataflow graph including the plurality of second nodes representing second computer operations, with at least one of the second nodes representing one or more imperative operations that implement the logic specified by the declarative operation, where the one or more imperative operations are unrepresented by the first nodes in the first dataflow graph, and storing, in a data store, the second dataflow graph.

In an aspect 2 according to aspect 1, the first dataflow graph into the second dataflow graph includes creating the imperative operation and creating a given second node that represents the imperative operation, with the given second node being unrepresented in the first dataflow graph.

In an aspect 3 according to any of aspects 1 or 2, one of the second operations represented in the second dataflow graph and unrepresented in the first dataflow graph is selected from the group consisting of a sort operation, a data type operation, a join operation with a specified key and a partition operation.

In an aspect 4 according to any of aspects 1 to 3, one or more of the second operations at least: (i) are required for processing data in accordance with one or more of the first operations specified in the first dataflow graph, or (ii) improve processing data in accordance with one or more of the first operations specified in the first dataflow graph, relative to processing data without the one or more additional operations.

In an aspect 5 according to any of aspects 1 to 4, the method further includes transforming the second dataflow graph into an optimized dataflow graph by applying one or more dataflow graph optimization rules to the second dataflow graph to improve a computational efficiency of the second dataflow graph, relative to a computational efficiency of the second dataflow graph prior to the applying.

In an aspect 6 according to any of aspects 1 to 5, the one or more dataflow graph optimization rules include at least one of removing a redundant node from the second dataflow graph, removing a dead node from the second dataflow graph, changing an order of nodes in the second dataflow graph, reducing a strength of a node in the second dataflow graph, combining two or more nodes in the second dataflow graph, transforming a node in the second dataflow graph from serial operation to parallel operation, or inserting a partition operation in the second dataflow graph.

In an aspect 7 according to any of aspects 1 to 6, at least one of the second operations includes an automatic parallelism operation or an automatic partitioning operation.

In an aspect 8 according to any of aspects 1 to 7, at least one of the second operations includes a sort operation.

In an aspect 9 according to any of aspects 1 to 8, at least one of the second operations includes an operation to specify metadata among one or more of the second nodes.

In an aspect 10 according to any of aspects 1 to 9, the method further includes providing data to generate a graphical editor interface that includes a canvas portion and a catalog portion, with the catalog portion including one or more selectable icons for visually depicting, in the canvas portion, logic of a computation, receiving icon selection data representing logic of a computation depicted in the canvas portion, with the icon selection data specifying at least one of the one or more selectable icons selected from the catalog portion and included in the canvas portion, and generating, from the icon selection data received, the first dataflow graph including the plurality of first nodes that represent the logic specified in the canvas portion, with at least one of the first nodes representing the least one of the one or more selectable icons selected from the catalog portion.

In an aspect 11 according to any of aspects 1 to 10, each selected icon represents an instruction to access data from a data catalog that pre-formats data or specifies a format of data that is accessed through the data catalog.

In an aspect 12 according to any of aspects 1 to 11, the first dataflow graph is a user defined dataflow graph.

In an aspect 13 according to any of aspects 1 to 12, the method further includes providing data to generate a graphical editor interface that includes a canvas portion and a catalog portion, with the catalog portion including plural dataset selection icons and plural transformation selection icons, generating an initial node in the first dataflow graph in accordance with elements stored in a storage unit represented by a selected dataset selection icon and a selected transformation selection icon, labeling the initial node to provide a labeled node, and rendering, in the canvas portion, a visual representation of the labeled node.

In an aspect 14 according to any of aspects 1 to 13, the initial node has an operation placeholder field to hold an operation and a data placeholder field to hold a source or sink for data.

In an aspect 15 according to any of aspects 1 to 14, modifying further includes: retrieving from a storage system elements of the operation held in the operation placeholder field, and retrieving from the storage system elements of the data source or the data sink held in the data placeholder field to populate the data placeholder field with a link pointing to the source or the sink for the data.

In an aspect 16 according to any of aspects 1 to 15, the method further includes providing data to render the first data flow graph in the canvas portion of the graphical editor interface.

In an aspect 17 according to any of aspects 1 to 16, upon labeling of all of the initial nodes that were generated, the method further includes: compiling all labeled nodes of the first dataflow graph into the second dataflow graph that is a computational dataflow graph.

In an aspect 18 according to any of aspects 1 to 17, upon labeling of all of the initial nodes that were modified, the method further includes: optimizing all labeled nodes of the first dataflow graph, wherein optimizing the labeled nodes of the first dataflow graph further includes optimizing the elements stored in at least one of the labeled nodes.

In an aspect 19 according to any of aspects 1 to 18, the method further includes accessing a prototype node and applying an algorithm that copies parameters from the accessed prototype node to modify at least one of the initial nodes.

In an aspect 20 according to any of aspects 1 to 19, at least one parameter of the initial node is a set parameter that is not overwritten by the prototype node.

In an aspect 21 according to any of aspects 1 to 20, the prototype node declares at least one of the initial node, ports on the initial node, or parameters of components presented in the canvas of the editor interface.

In an aspect 22 according to any of aspects 1 to 21, applying a prototype replaces descriptors for an existing parameter with the descriptor from the prototype but does not replace an existing value for a parameter.

In an aspect 23 according to any of aspects 1 to 22, the method further includes applying metadata and transforms that compute the values described in the first dataflow graph.

In an aspect 24 according to any of aspects 1 to 23, the labels refer to one or more of keys, values, names, and sources.

In an aspect 25 according to any of aspects 1 to 24, at least some of the plurality of initial nodes storing one or more elements stored in storage units represented by selected dataset selection icons and storage units represented by selected transformation selection icons at least partially specify corresponding storage unit functions for the at least some of the plurality of initial nodes.

In a general aspect 26, a system for transforming a first dataflow graph into a second dataflow graph, where the first dataflow graph includes a plurality of first nodes representing a plurality of first computer operations, where the second dataflow graph includes a plurality of second nodes representing a plurality of second computer operations, and where at least some of the second computer operations are unrepresented by the first nodes in the first dataflow graph, includes one or more processors and one or more storage devices storing instructions that are operable, when executed by the one or more processors, to cause the one or more processors to perform operations including: generating the first dataflow graph with the plurality of first nodes representing first computer operations in processing data, with at least one of the first computer operations being a declarative operation that specifies one or more characteristics of one or more results of processing of data, transforming the first dataflow graph into the second dataflow graph for processing data in accordance with the first computer operations, the second dataflow graph including the plurality of second nodes representing second computer operations, with at least one of the second nodes representing one or more imperative operations that implement the logic specified by the declarative operation, where the one or more imperative operations are unrepresented by the first nodes in the first dataflow graph, and storing, in a data store, the second dataflow graph.

In a general aspect 27, a non-transitory computer readable medium stores instructions for causing a computing system to: generate a first dataflow graph with a plurality of first nodes representing first computer operations in processing data, with at least one of the first computer operations being a declarative operation that specifies one or more characteristics of one or more results of processing of data, transform the first dataflow graph into a second dataflow graph for processing data in accordance with the first operations, the second dataflow graph including a plurality of second nodes representing second computer operations, with at least one of the second nodes representing one or more imperative operations that implement the logic specified by the declarative operation, where the one or more imperative operations are unrepresented by the first nodes in the first dataflow graph, and store, in a data store, the second dataflow graph.

In a general aspect 28, a method for transforming a first dataflow graph into a second dataflow graph, where the first dataflow graph includes a plurality of first nodes representing a plurality of first computer operations, where the second dataflow graph includes a plurality of second nodes representing a plurality of second computer operations, and where at least some of the second computer operations are unrepresented by the first nodes in the first dataflow graph, includes: generating the first dataflow graph with the plurality of first nodes representing the first computer operations in processing data, transforming the first dataflow graph into the second dataflow graph for processing data in accordance with the first computer operations, the second dataflow graph including the plurality of second nodes representing the second computer operations, with at least a given one of the second computer operations being selected from the group consisting of a sort operation, a data type operation, a join operation with a specified key and a partition operation, and with the at least given one of the second computer operations being unrepresented by the first nodes in the first dataflow graph, and storing, in a data store, the second dataflow graph.

In a general aspect 29, a system for transforming a first dataflow graph into a second dataflow graph, where the first dataflow graph includes a plurality of first nodes representing a plurality of first computer operations, where the second dataflow graph includes a plurality of second nodes representing a plurality of second computer operations, and where at least some of the second computer operations are unrepresented by the first nodes in the first dataflow graph, includes one or more processors and one or more storage devices storing instructions that are operable, when executed by the one or more processors, to cause the one or more processors to perform operations including: generating the first dataflow graph with the plurality of first nodes representing the first computer operations in processing data, transforming the first dataflow graph into the second dataflow graph for processing data in accordance with the first computer operations, the second dataflow graph including the plurality of second nodes representing the second computer operations, with at least a given one of the second computer operations being selected from the group consisting of a sort operation, a data type operation, a join operation with a specified key and a partition operation, and with the at least given one of the second computer operations being unrepresented by the first nodes in the first dataflow graph, and storing, in a data store, the second dataflow graph.

In a general aspect 30, a non-transitory computer readable medium storing instructions for causing a computing system to: generate a first dataflow graph with a plurality of first nodes representing the first computer operations in processing data, transform the first dataflow graph into a second dataflow graph for processing data in accordance with the first operations, the second dataflow graph including a plurality of second nodes representing the second computer operations, with at least a given one of the second computer operations being selected from the group consisting of a sort operation, a data type operation, a join operation with a specified key and a partition operation, and with the at least given one of the second computer operations being unrepresented by the first nodes in the first dataflow graph, and store, in a data store, the second dataflow graph.

All or part of the foregoing (including aspects 1-30 and any combination thereof) may be implemented as a computer program product that includes instructions that are stored on one or more non-transitory machine-readable storage media, and that are executable on one or more processing devices. All or part of the foregoing may be implemented as an apparatus, method, or electronic system that may include one or more processing devices and memory to store executable instructions to implement the stated functions.

The term "unrepresented" used herein may mean that the at least some of the second computer operations do not directly or indirectly occur in the first dataflow graph or none of the plurality of first nodes represents the at least some of the second computer operations.

One or more of the above implementations may provide one or more of the following advantages. The techniques described here allow users with minimal technical background to specify data processing functionality with a user friendly graphical user interface. The dataflow graph system provides a graphical user interface that includes a canvas and dataset catalog having a plurality of transformation icons and dataset icons. By selecting the desired icons and placing them on the canvas, a user can easily create and modify a dataflow graph, and thereby its associated computations, without the need to specify (or re-specify) dataset access details or other low-level implementation details, such as sort and partition operations. In this way, the dataflow graph system provides a visual representation of the dataflow graph as it is being developed by the user and enables schema driven development. In addition, the system can include automatic layout capabilities that facilitate development by automatically connecting icons placed by the user.

Once a dataflow graph is completed, the system transforms the dataflow graph created by the user into a transformed dataflow graph that can be compiled and executed. As part of this process, the system automatically optimizes the dataflow graph by adding imperative operations that are necessary to carry out the declarative operations specified in the dataflow graph, such as by automatically adding parallelism and partitioning operations, adding sorting operations for joins and roll-ups, and specifying intermediate metadata. The system also improves the data processing of the dataflow graph itself, such as by removing redundant components or narrowing records.

The details of one or more implementations are set forth in the accompanying drawings and the description below. Other features, objects, and advantages of the technology described here will be apparent from the description and drawings, and from the claims.

DESCRIPTION OF DRAWINGS

FIGS. 2A and 2B are block diagrams of a dataflow graph

DETAILED DESCRIPTION

The technology described here relates to techniques for generating easily modifiable computational graphs that can be optimized and transformed for compilation. In some implementations, a dataflow graph system provides a graphical user interface that includes a canvas and dataset catalog having a plurality of transformation selection icons and dataset selection icons. By selecting the desired icons and placing them on the canvas, a user can easily create, visualize, and modify a dataflow graph without the need to specify (or re-specify) dataset access details or other low-level implementation details, such as sort and partition operations. Generally, an operation, as used herein, refers to a computer operation, e.g., one or more operations or instructions executed or implemented by a machine, computer system, and so forth.

The system receives data indicative of the icons selected by the user and generates a first dataflow graph (sometimes referred to here as an "intermediate dataflow graph") by modifying nodes of the dataflow graph to include the declarative operations and datasets referenced by the selected icons. Once the first dataflow graph is completed, the system transforms the dataflow graph into a second dataflow graph (sometimes referred to here as a "transformed dataflow graph") that can be compiled and executed. As part of this process, the system automatically optimizes the first dataflow graph to produce the second dataflow graph by adding imperative operations to the second dataflow graph which are necessary to carry out the declarative operations specified in the first dataflow graph, such as by automatically adding parallelism and partitioning operations, adding sorting operations for joins and roll-ups, and specifying intermediate metadata. The system also improves the data processing by the second dataflow graph itself, such as by removing redundant components or narrowing records as described below in context of FIG. 4D.

Figure 1:
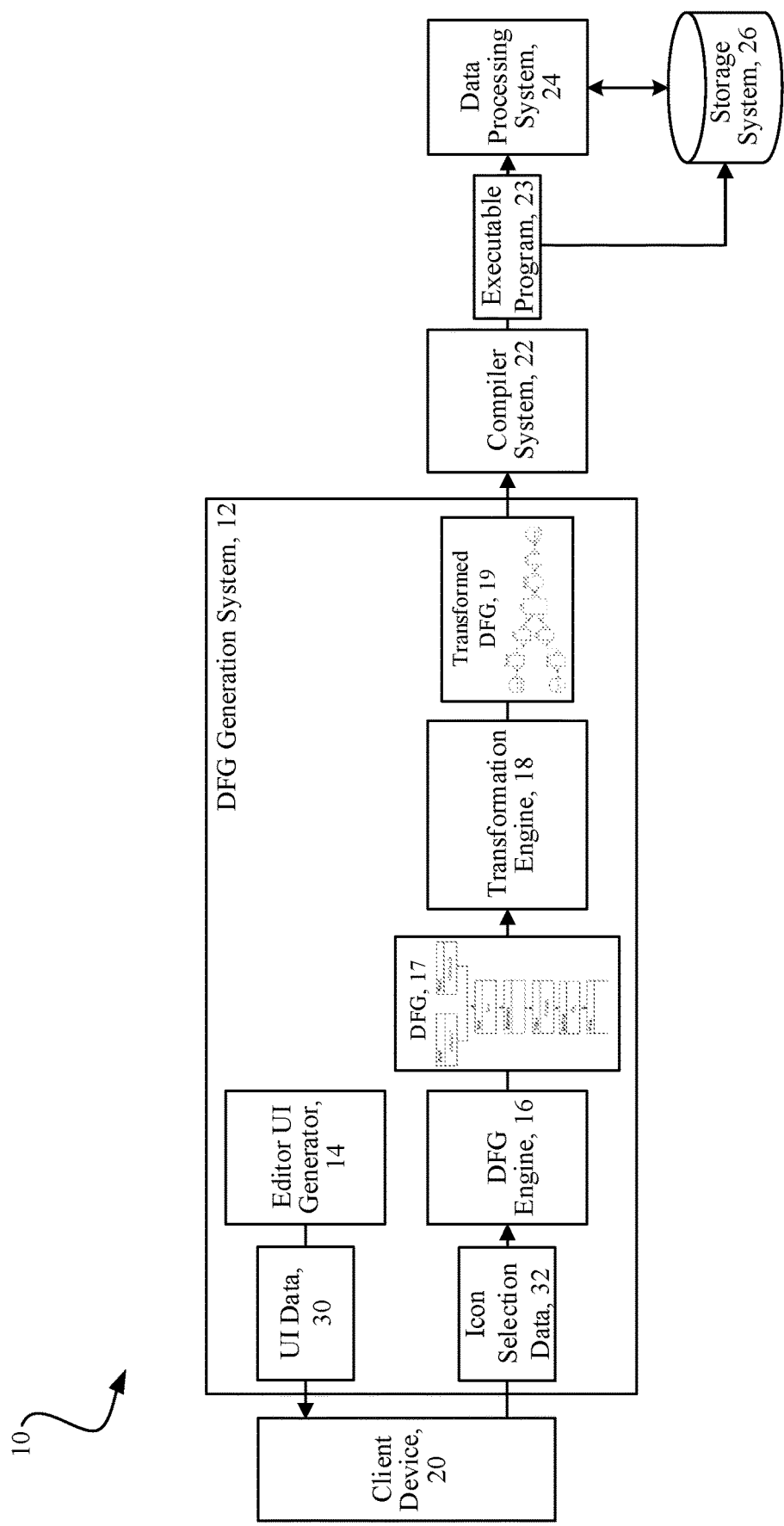
FIG. 1 is a block diagram of a system for specifying computational graphs.

FIG. 1 illustrates a schematic diagram of a system 10 for specifying computational graphs. The system 10 (also referred to here as an "execution environment") includes a dataflow graph generation system 12 having an editor user interface generator 14, a dataflow graph (DFG) engine 16, and a transformation engine 18. The graph generation system 12 is operatively coupled to a client device 20 to provide access to the graph generation system 12, and thereby also to the execution environment, and to a compiler system 22 to compile dataflow graphs produced by the graph generation system 12. The compiled dataflow graphs are provided to a data processing system 24 and a storage system 26 for execution and storage. The storage system 26 includes one or more data sources, such as storage devices or connections to online data sources, each of which may store or provide data in any of a variety of formats (e.g., database tables, spreadsheet files, flat text files, or a native format used by a mainframe, among others). In particular, the storage system 26 may store input data, including metadata and record formats, which can be retrieved by the data processing system 24 to execute a compiled dataflow graph, as well as output data produced through execution of the compiled dataflow graph.

In general, the execution environment may be hosted, for example, on one or more general-purpose computers under the control of a suitable operating system, such as a UNIX-based operating system or a Windows-based operating system, among others. For example, the execution environment can include a multiple-node parallel computing environment including a configuration of computer systems using multiple processing units (such as CPUs) or processor cores, either local (e.g., multiprocessor systems such as symmetric multi-processing (SMP) computers), or locally distributed (e.g., multiple processors coupled as clusters or massively parallel processing (MPP) systems, or remote, or remotely distributed (e.g., multiple processors coupled via a local area network (LAN) or wide-area network (WAN)), or any combination thereof.

Unlike other systems that access a generated representation of a dataflow graph and generate computer instructions that define the graph, the system 10 accesses an intermediate graph (e.g., a dataflow graph 17) and transforms the intermediate graph through optimization and other operations to produce a transformed graph (e.g., a transformed dataflow graph 19) for compilation. For example, the dataflow graph engine 16 receives selection data from the client device 20 that indicates the data sources, data sinks, and data processing functionality for a desired computational graph. A user of the client device 20 need not specify data access details or other low-level implementation details, as these details can be derived by the dataflow graph generation system 12. Based on the selection data, the dataflow graph engine 16 generates the dataflow graph 17 or modifies a previously created dataflow graph 17. The transformation engine 18 receives the completed dataflow graph 17 and transforms the dataflow graph into a transformed dataflow graph 19 by, for example, removing redundancies in the dataflow graph 17, adding sorts or partitions to the dataflow graph 17, and specifying intermediate metadata (e.g., metadata for translating or otherwise transforming the dataflow graph 17 into the transformed dataflow graph 19), among other optimizations and transforms, as described below in context of FIG. 4D. The transformed dataflow graph 19 is subsequently provided to the compiler system 22 to compile the transformed dataflow graph 19 into a compiled computational graph (e.g., an executable program 23).

In general, the dataflow graph 17 (sometimes referred to as a "modified dataflow graph") represents core constructs of compiled graphs, such as the transformed dataflow graph 19, which have nodes (or components). The dataflow graph 17 optionally includes parameters (e.g., a name, a value, a location, an interpretation). In some implementations, the dataflow graph 17 includes input and output ports on the graph itself, as in a graph intended to be used as a subgraph.

In some implementations, a node (or component) possesses or is of a node "kind" that indicates the behavior or function of the node. The node kind is used to select a prototype for a node, to facilitate pattern matching (e.g., to find a sort node followed by a sort node), and to determine what component is instantiated in the transformed dataflow graph 19. For example, a trash node in the dataflow graph 17 can be instantiated as a trash node in the transformed dataflow graph 19. A node (or component) can include input ports, output ports, and parameters, as discussed below.

A node optionally has a label which identifies the node. In some implementations, if a node does not have a label, the system assigns a label to the node. Node labels can include an arbitrary collection of alphanumeric characters, whitespace, and punctuation and do not have to be unique (but can be made unique during translation to a graph). The system can use the node label to refer to a node (or the node's input ports, output ports, or parameters) to, for example, define the input or output of the node or the data flow between nodes.

Referring to FIG. 2A, one implementation of the dataflow graph 17 is shown as including nodes 34a through 34n. Each of the nodes 34 include at least one operation placeholder field and at least one data placeholder field. For example, the "initial" node 34a has an operation placeholder field 35a to hold one or more operation elements 35a' and a data placeholder field 35b to hold one or more data source or a data sink elements 35b'. The operation elements 35a' can specify code or a location of code that will perform a function on data input to or output from the initial node 34a. The data source or data sink elements 35b' can specify the data source or data sink, or a location of the data source or data sink, for the initial node 34a (for the function of the initial node 34a). In some implementations, the elements 35a' or the elements 35b', or both, include links or addresses to the storage system 26, such as a link to a database or a pointer to code included in the storage system 26. In some implementations, the elements 35a' or the elements 35b', or both, include a script.

During construction of the dataflow graph 17, each of the nodes 34 can be modified by retrieving the operation elements to be placed in the operation placeholder field and the data source or data sink elements to be placed in the data placeholder field to populate the respective fields. For example, the initial node 34a is modified during construction by retrieving (e.g., from the storage system 26) the operation elements 35a' to populate the operation placeholder field 35a with the specified function or a link pointing to the function, and by retrieving the data source or the data sink elements 35b' to populate the data placeholder field 35b with a link pointing to the source or the sink for the data. Upon completing the modification of a particular node 34, the node can be labeled to provide a labeled node. After each of the nodes 34 have been modified (and labeled), the completed dataflow graph 17 is stored (e.g., in the storage system 26) and used to generate other dataflow graphs, as described below.

In some implementations, each of the nodes 34 of the dataflow graph 17 are initially unmodified. For example, each of the nodes 34 can have an empty operation placeholder field 35a and data placeholder field 35b that are subsequently modified to include the specified operation elements 35a' and data source or data sink elements 35b', as described above. In some implementations, the dataflow graph 17 is a previously completed dataflow graph, and some or all of the nodes 34 have corresponding operation placeholder fields 35a holding operation elements 35a' and data placeholder fields 35b holding data source or data sink elements 35b'. Such a completed dataflow graph 17 can be further modified (e.g., by retrieving additional or alternative elements 35a', 35b' to be placed in the respective fields 35a, 35b) and stored as a new or modified dataflow graph.

In some implementations, a particular node, such as the initial node 34a, is "reused" to produce a new, optionally labeled node that is associated with the prior node 34a. This iterative process of producing new nodes from the initial node 34a continues until a user has specified functionality for the desired computational graph. Upon completion of the iterative process, a completed dataflow graph 17 is provided. The completed dataflow graph 17 includes a plurality of nodes 34a through 34n that were instantiated from, for example, the initial node 34a. The completed dataflow graph 17 can be stored (e.g., in the storage system 26) and used to generate other dataflow graphs, as described below.

Figure 2B:
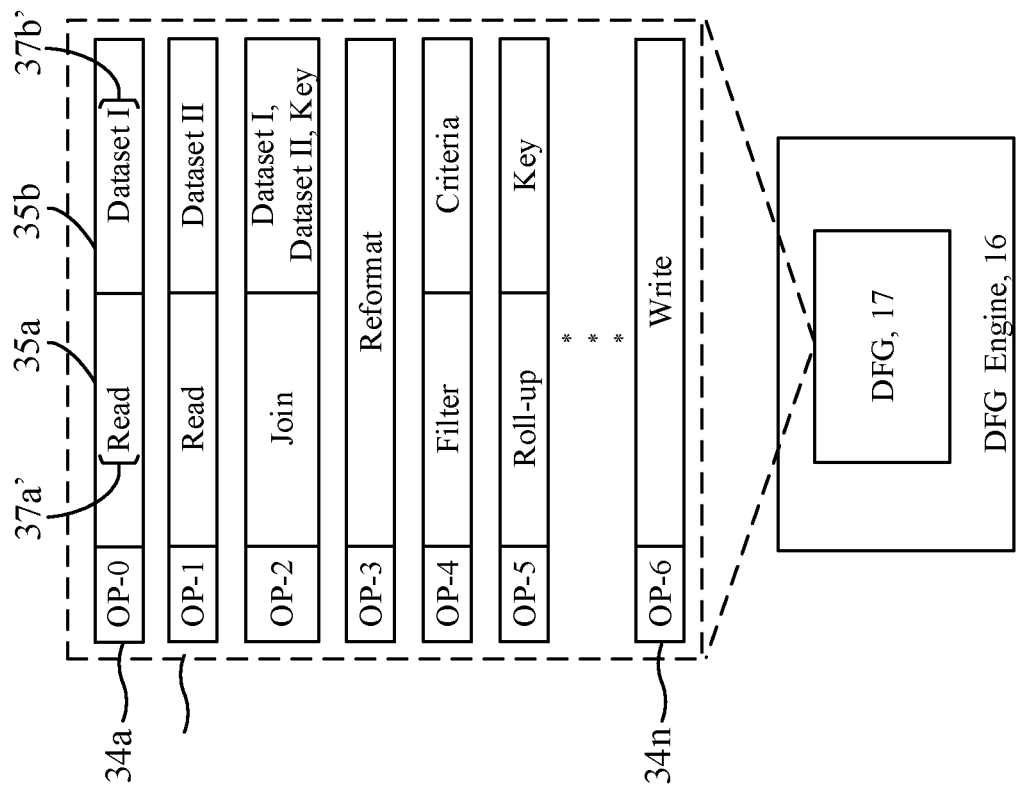

FIG. 2B illustrates one implementation of a completed (e.g., modified) dataflow graph 17. The modified dataflow graph 17 is shown as including seven nodes labeled OP-0 to OP-6 with corresponding operation placeholder fields 35a holding operation elements and data placeholder fields 35b holding data source or data sink elements. For example, the node 34a labeled OP-0 includes a read operation element 37a' indicating that the 'Dataset I' data source element 37b' is to be read. The dataflow graph 17 corresponds to the dataflow graph depicted in FIG. 1 and described in detail below with reference to FIGS. 2-4. The modified dataflow graph 17 is stored in the storage system 26 as, for example, a data structure.

Figure 3A:
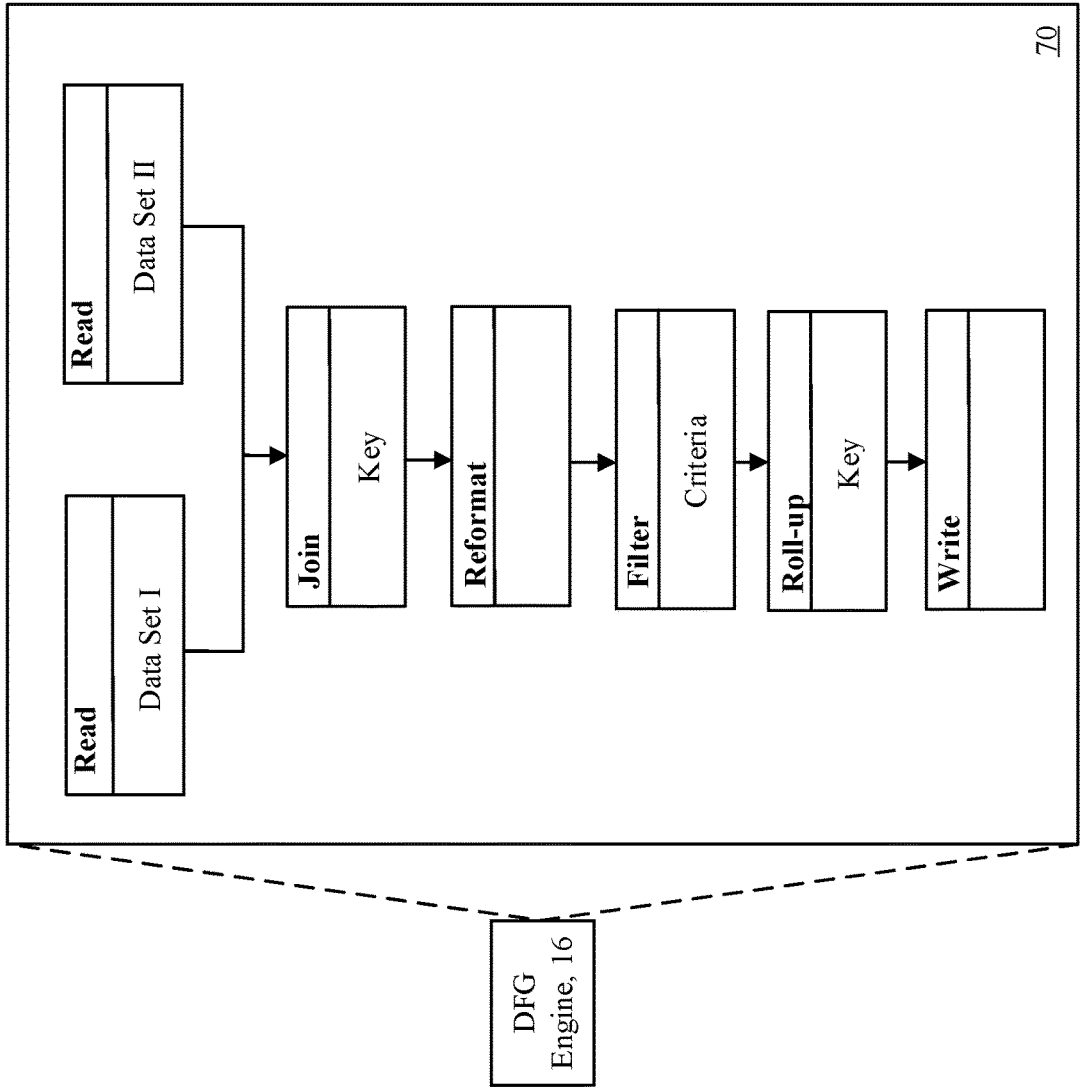
FIGS. 3A-3C are diagrams of visual representations of a dataflow graph at different stages of construction.
Figure 3B:
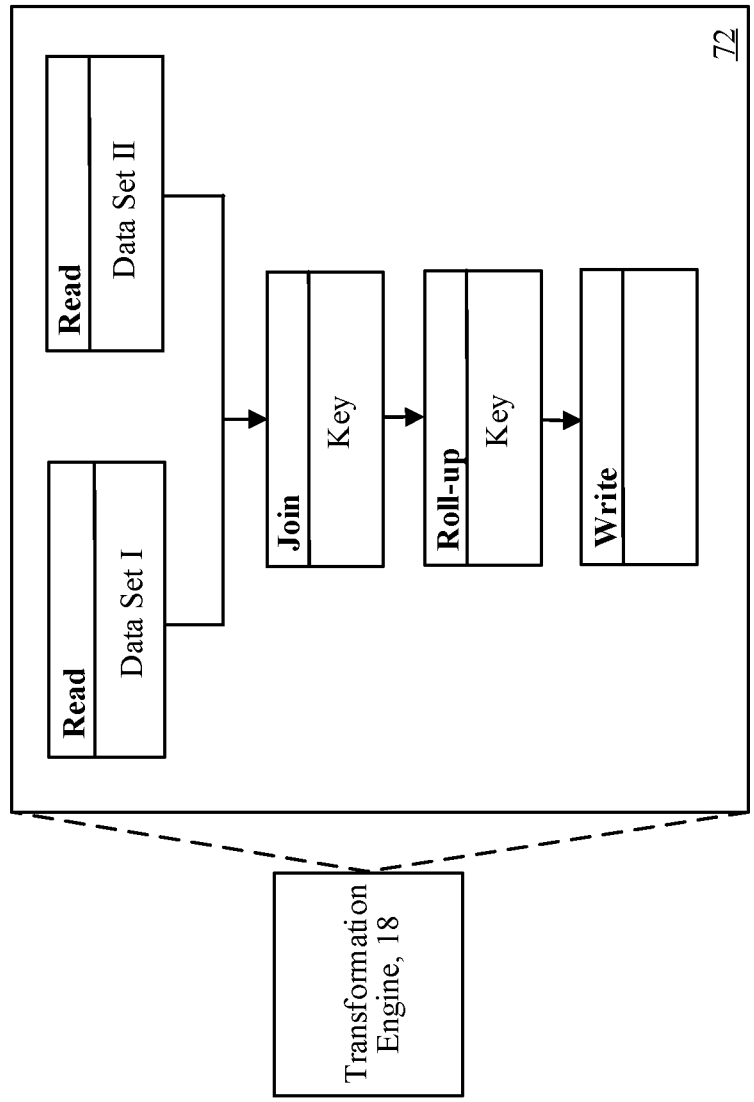
Figure 3C:
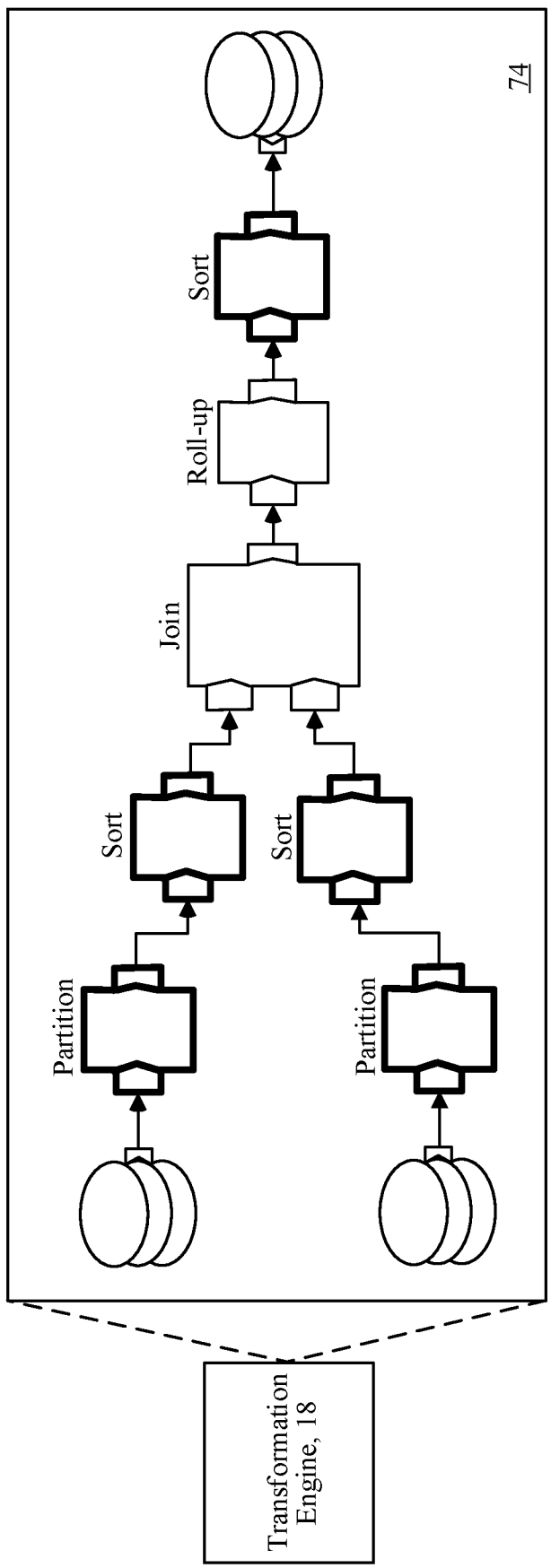

Referring now to FIGS. 3A-3C, visualizations of the dataflow graph 17 and the transformed dataflow graph 19 are shown at various stages of construction. For example, FIG. 3A depicts a visualization 70 of the completed (e.g., modified) dataflow graph 17. FIG. 3B shows a visualization 72 of the completed dataflow graph 17 after optimization by the transformation engine 18. As shown in the visualization 72, optimization of the completed dataflow graph 17 has resulted in removal of the reformat and filter operations which the transformation engine 18 has determined are redundant or otherwise unnecessary for the functionality of the graph, as described below in context of FIG. 4D. FIG. 3C depicts a visualization 74 of a transformed graph 19 produced by the transformation engine 18 to perform the same functionality as the optimized completed dataflow graph 17 (FIG. 3B). As shown in the visualization 74, additional sort and partition components that were not needed by the completed dataflow graph 17 have been added to the transformed dataflow graph 19 to facilitate compilation and execution.

In general, the transformation engine 18 performs optimizations or other transforms that may be required for processing data in accordance with one or more of the operations specified in the dataflow graph 17, or to improve processing data in accordance with one or more of the operations specified in the dataflow graph 17, relative to processing data without the optimizations or transforms, or both. For example, the transformation engine 18 adds one or more sort operations, data type operations, join operations, including join operations based on a key specified in the dataflow graph 17, partition operations, automatic parallelism operations, or operations to specify metadata, among others, to produce a transformed dataflow graph 19 having the desired functionality of the dataflow graph 17. In some implementations, the transformed dataflow graph 19 is (or is transformed into) an optimized dataflow graph by applying one or more dataflow graph optimization rules to the transformed dataflow graph to improve the computational efficiency of the transformed dataflow graph, relative to a computational efficiency of the transformed dataflow graph prior to applying the optimizations. The dataflow graph optimization rules can include, for example, dead or redundant component elimination, early filtering, or record narrowing, among others, as described below in context of FIG. 4D.

Figure 4A:
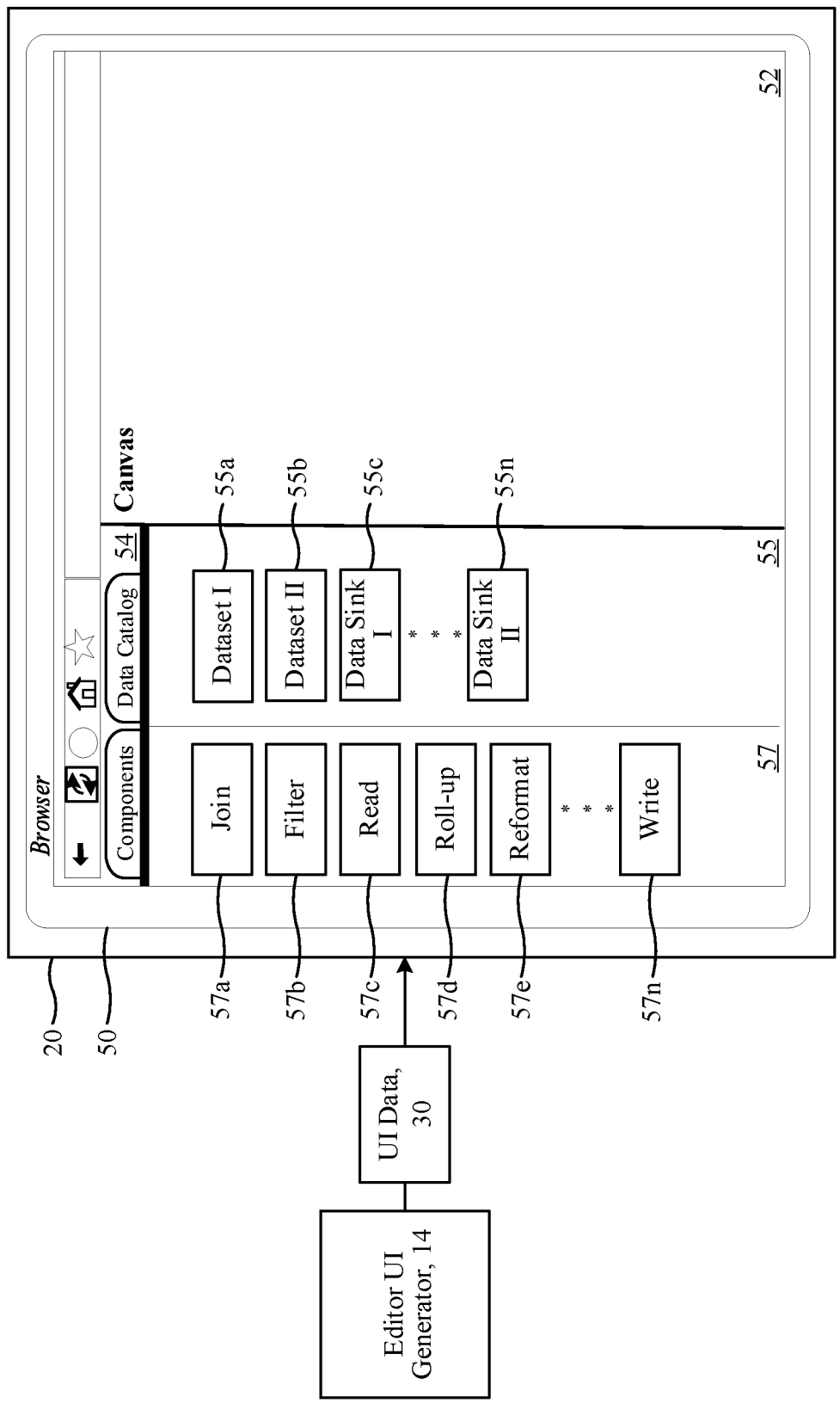
FIGS. 4A-4D are block diagrams of the system of FIG. 1 at different stages of operation.

Referring now to FIG. 4A, an example graphical editor interface 50 for editing a computation graph (e.g., the dataflow graph 17) is shown. The editor UI generator 14 provides UI data 30 to the client device 20 to cause the client device to generate the graphical editor interface 50. In general, the graphical editor interface includes a canvas portion 52 and a catalog portion 54. The catalog portion 54 includes a dataset selection portion 55 that includes dataset selection icons 55a through 55n and a transformation selection portion 57 that includes transformation selection icons 57a through 57n. The dataset selection icons 55a-55n reference corresponding elements (e.g., data source or data sink elements 35b') stored in the storage system 26 and represented by the dataset selection icons. In some implementations, these elements include datasets (or pointers to datasets) on which an operation can be performed or in which data can be stored. The transformation selection icons 57a-57n reference corresponding elements (e.g., operation elements 35a') stored in the storage system 26 and represented by the transformation selection icons. In some implementations, these elements include data (or pointers to data) specifying a type of operation to be performed (e.g., a write operation, a join operation, and so forth).

In operation, a user of the client device 20 selects an icon from the transformation selection portion 57 (e.g., one of the transformation selection icons 57a-57n) and, for example, drags the icon onto the canvas 52. The user also selects an icon from the catalog selection portion 55 (e.g., one of the dataset selection icons 55a-55n) and, for example, drags the icon onto the canvas 52, which may include dragging the dataset selection icon onto a desired transformation selection icon on the canvas 52. In this example, stored data structures or other stored data relate the icons to the elements (e.g., the operation elements 35a' and data source or data sink elements 35b') used to modify the dataflow graph 17, as described below in context of FIG. 4C. The user's selection causes the dataflow graph engine 16 to receive icon selection data 32, such as data indicative of the selected dataset selection icon and the selected transformation selection icon from the generated editor interface. Icons in the canvas 52 can be automatically connected by, for example, the graph generation system 12. In some implementations, the icons are automatically connected such that the placement of one icon beneath another icon in the canvas 52 causes graph generation system 12 to automatically draw a connection between the icons. In some implementations, the user has the option to connect the icons.

Figure 4B:
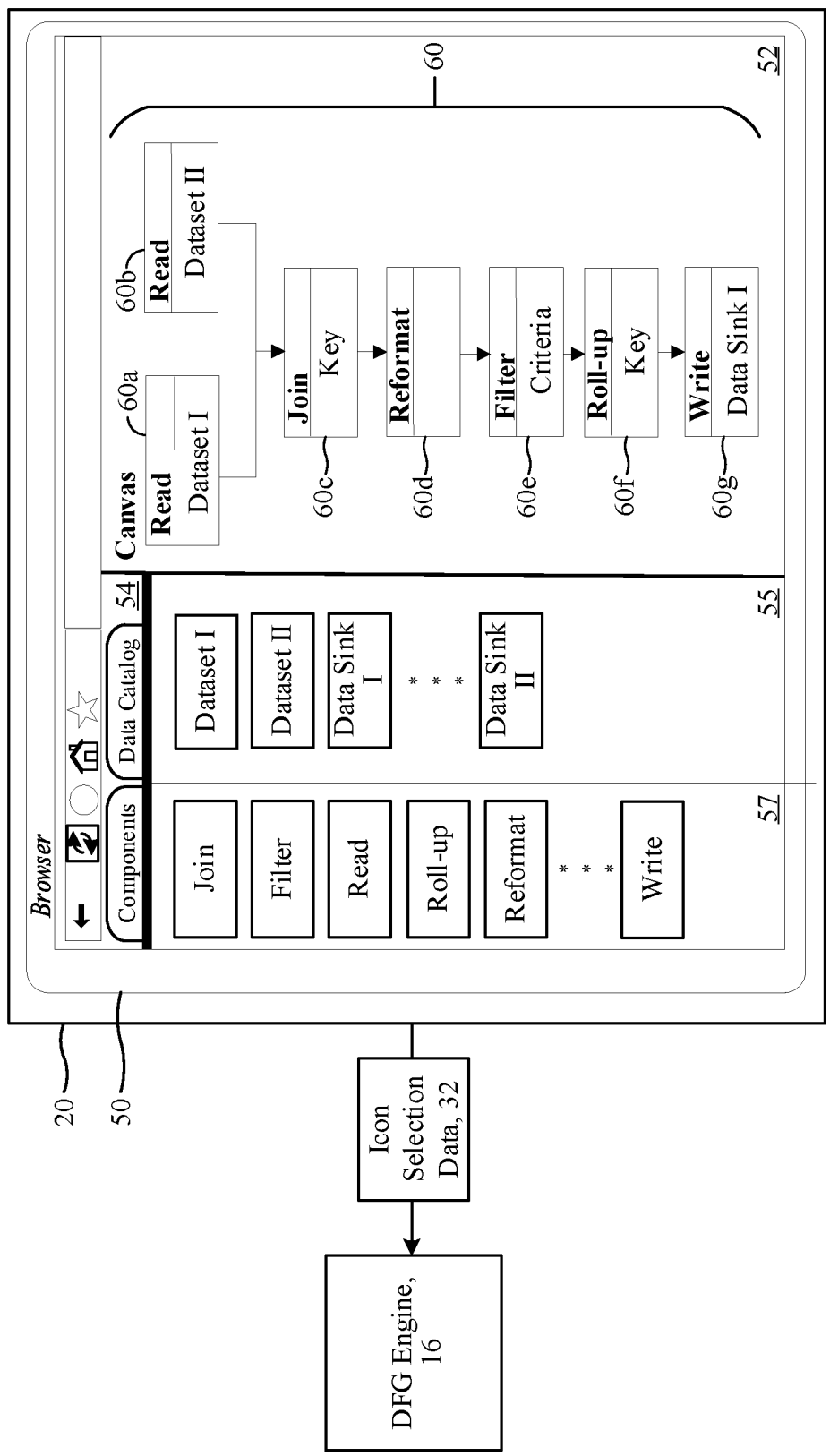

FIG. 4B illustrates the editor interface 50 having a visual representation 60 of a completed dataflow graph in the canvas portion 52. The visual representation 60 of the completed dataflow graph (also referred to here as completed dataflow graph 60 for convenience) was generated by user selections of icons from the catalog portion 54 (e.g., selections from the dataset selection portion 55 and the transformation selection portion 57) and placing of the icons on the canvas 52 in a desired arrangement. To go from FIG. 4A to 4B, the user can drag the icons (e.g., icons 55a-n, 57a-n) onto the canvas 52 to produce a desired visual dataflow graph 60. The completed dataflow graph 60 includes a first component icon 60a representative of a read operation applied to dataset I, a second component icon 60b representative of a read operation applied to dataset II, a third component icon 60c representative of a join operation applied to dataset I and dataset II based on a key value, a fourth component icon 60d representative of a reformat operation applied to output of the join operation 60c, a fifth component icon 60e representative of a filter operation applied to results of the reformat operation 60d, a sixth component icon 60f representative of a roll-up operation applied to results from the filter operation 60e, and a seventh component icon 60g representative of a write operation applied to data sink I.

Figure 4C:
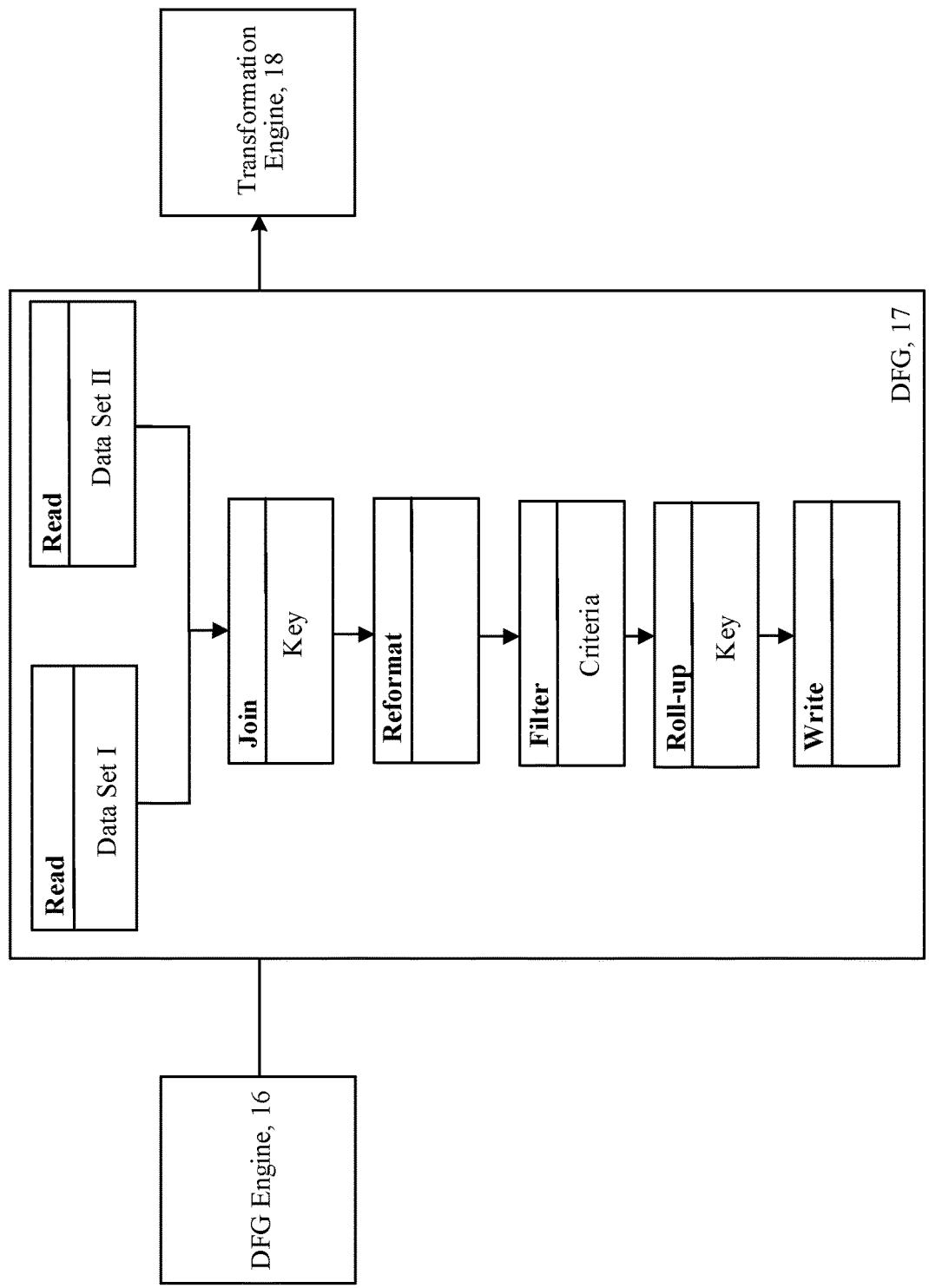

Icon selection data 32 indicative of the selected dataset icons and the selected transformation icons (and, in some implementations, their arrangement) that make up the completed dataflow graph 60 is received by the dataflow graph engine 16. As shown in FIG. 4C, the dataflow graph engine 16 modifies the dataflow graph 17 based on the selection data (e.g., the icon selection data 32) to include the selected elements and produce a completed dataflow graph 17 having the functionality of the specified dataflow graph (e.g., the specified dataflow graph visualized in the visualization 60). To do so, the dataflow graph engine 16 processes the icon selection data 32 to identify operation elements 35a' or data elements 35b', or both, that correspond to the icon selection data. The dataflow graph engine 16 then uses the identified elements 35a', 35b' to produce the dataflow graph 17 by populating (or modifying) the fields 35a, 35b for each node 34a-34n of the dataflow graph 17. For example, the icon selection data 32 received by the dataflow graph engine 16 may specify that the dataflow graph 60 includes a transformation selection icon 57a representative of a read operation applied to a data selection icon 55a representative of a dataset I. The dataflow graph engine 16 may process this icon selection data 32 with one or more stored data structures or other stored data that relate the selected icon 57a to an operation element 35a' representing a read operation. The dataflow graph engine 16 may then populate (or modify) the operation field 35a of a node (e.g., node 34a) of the dataflow graph 17 with the operation element 35a' (or a link pointing to the operation element 35a') corresponding to the read operation. Similarly, in this example the dataflow graph engine 16 may process the received icon selection data 32 with one or more stored data structures or other stored data that relate the dataset selection icon 55a to a data source element 35b' representing dataset I. The dataflow graph engine 16 may then populate (or modify) the data field 35b of the node 34a of the dataflow graph 16 with the data source element 35b' (or a link pointing to the data source element 35b') corresponding to the dataset I.

Figure 4D:
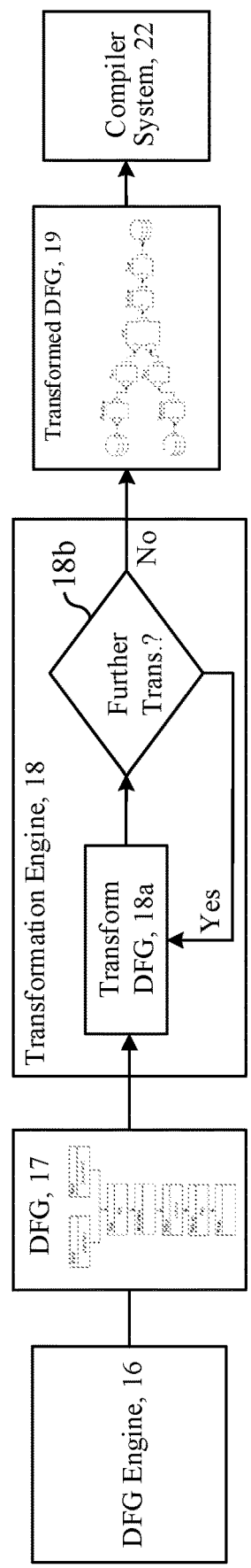

Referring now to FIG. 4D, the completed (e.g., modified) dataflow graph 17 is provided to the transformation engine 18. In general, the completed dataflow graph 17: (1) may include nodes that represent redundant data processing operations; (2) may require performing data processing operations whose results are subsequently unused; (3) may require unnecessarily performing serial processing in cases where parallel processing is possible; (4) may apply a data processing operation to more data than needed in order to obtain a desired result; (5) may break out computations over multiple nodes, which significantly increases the computational cost of performing the computations in situations where the data processing for each dataflow graph node is performed by a dedicated thread in a computer program, a dedicated computer program (e.g., a process in an operating system), or a dedicated computing device; (6) may require performing a stronger type of data processing operation that requires more computation (e.g., a sort operation, a rollup operation, etc.) when a weaker type of data processing operation that requires less computation (e.g., a sort-within-groups operation, a rollup-within-groups operation, etc.) will suffice; (7) may require the duplication of processing efforts; or (8) may not include operations or other transformations that are useful or required for processing data, or combinations of them, among others.

Accordingly, the transformation engine 18 applies one or more of the following optimizations or other transformations to the dataflow graph 17 that are useful or required for processing data in accordance with the operations specified in the dataflow graph 17, or to improve processing data in accordance with the operations specified in the dataflow graph 17, relative to processing data without the optimizations or transforms, or both. For instance, as described above, a user may create the dataflow graph 17 by selecting the desired icons and placing them on the canvas without the need to specify low-level implementation details, such as sort and partition operations. However, these operations may be useful or required in the transformed dataflow graph 19 in order to compile and execute the dataflow graph to process data in accordance with the operations specified in the dataflow graph 17, or may improve the processing of data in accordance with the operations specified in the dataflow graph 17 (e.g., by increasing the speed of processing, reducing the consumption of computing resources, etc.), or both. Therefore, the transformation engine 18 may add one or more operations to the transformed dataflow graph 19, such as sort operations, data type operations, join operations with a specified key, partition operations, automatic parallelism operations, or operations to specify metadata, among others, to optimize or implement the operations specified in the dataflow graph 17. At least some of the operations added to the transformed dataflow graph 19 may be absent or otherwise unrepresented in the dataflow graph 17.

In some examples, to add these operations the transformation engine 18 may insert one or more nodes 34 representing the added operations into the dataflow graph 17 used to produce the transformed dataflow graph 19. In some examples, the transformation engine 18 may insert the added operation in the transformed dataflow graph 19 directly without modifying nodes of the dataflow graph 17. The transformation engine 18 may add these operations to all dataflow graphs 17 when producing their corresponding transformed dataflow graphs 19, may add these operations based on the operations included in the dataflow graph 17 (which may be identified using pattern matching techniques, as described below), or may add these operations based on some other optimization rule.

The transformation engine 18 may also optimize the dataflow graph 17 (or the transformed dataflow graph 19 itself) by applying one or more dataflow graph optimization rules to the dataflow graph to improve the computational efficiency of the transformed dataflow graph, such as by removing dead or redundant components (e.g., by removing one or more nodes 34 corresponding to the dead or redundant components), moving filtering steps earlier in the data flow (e.g., by moving one or more nodes 34 corresponding to the filtering components), or narrowing a record, among others. In this way, the transformation engine 18 optimizes and transforms the easily modifiable dataflow graph 17 into an optimized transformed dataflow graph 19 that is suitable for compilation.

The optimizations of a dataflow graph described here may include one or more of the following means of optimization. Additional optimizations of a dataflow graph may include one or more of the optimizations described in U.S. patent application Ser. No. 15/993,284, titled "Systems and Methods for Dataflow Graph Optimization," the entire content of which is incorporated herein by reference.

In some examples, the transformation engine 18 may identify two adjacent nodes (e.g., nodes 34) in the dataflow graph 17 representing respective operations, with the second operation duplicating or nullifying the effect of the first operation such that one of the operations is redundant. Accordingly, the transformation engine 18 may optimize the dataflow graph 17 by removing the node(s) 34 representing redundant operations (e.g., the nodes representing the duplicated or nullified operations) when producing the transformed dataflow graph 19. For example, the transformation engine 18 may identify two adjacent nodes 34 having the same operation. Because two adjacent nodes performing the same operation is typically redundant, it is not necessary to perform both of the operations and one of the two adjacent nodes can be removed to optimize the dataflow graph. As another example, the transformation engine 18 may identify two adjacent nodes 34 having a first node representing a repartition operation (which partitions data for parallel processing on different computing devices) followed by node representing the serialize operation (which operates to combine all the data for serial processing by a single computing device). Since the effect of repartitioning will be nullified by the subsequent serialize operation, it is not necessary to perform the repartitioning operation (e.g., the repartitioning operation is redundant), and the repartitioning operation can be removed by the transformation engine 18 during the optimization process.

In some examples, the transformation engine 18 may identify a first node representing a first operation that commutes with one or more other nodes representing other operations. If the first node commutes with the one or more other nodes, then the transformation engine 18 can optimize the dataflow graph by changing the order of the first node with at least one of the one or more other nodes (e.g., by rearranging the order of the nodes 34). In this way, the transformation engine 18 may optimize the dataflow graph by ordering the nodes and corresponding operations in a way that improves processing efficiency, speed, or otherwise optimizes processing by the dataflow graph without changing the result. Further, by commuting nodes in this way, the transformation engine 18 may be able to apply other optimizations. Referring back to the previous example, the transformation engine 18 may change the order of the first node with at least one of the one or more other nodes such that the first node representing the first sort operation is placed adjacent to a second node representing a second sort operation. As a result, the first and second sort operations become redundant, and the transformation engine 18 can optimize the dataflow graph by removing one of the first sort operation or the second sort operation (e.g., by removing the corresponding node 34 from the dataflow graph 17 when producing the transformed dataflow graph 19).

In some examples, the transformation engine 18 may identify and remove "dead" nodes representing unused or otherwise unnecessary operations. For example, the transformation engine 18 may identify one or more nodes representing operations whose results are unreferenced or unused (e.g., a sort operation that is unreferenced because the order resulting from the sorting operation is not needed or relied upon in subsequent processing). Accordingly, the transformation engine 18 may optimize the dataflow graph by removing the dead or unused operation (e.g., by removing the corresponding node 34 when producing the transformed dataflow graph 19).

In some examples, the transformation engine 18 may perform a strength reduction optimization on one or more nodes. For example, the transformation engine 18 may identify a first node representing a first operation of a first type (e.g., a first sort operation on a major key, a first rollup operation on a major key, etc.) followed by a second node representing a second operation of a second, weaker type (e.g., a second operation on a minor key, a sort-within-groups operation, a second rollup operation on a minor key, a grouped rollup operation, etc.). Because processing data by the first operation may require more computing resources than processing data by the second, weaker operation, the transformation engine 18 may perform a strength reduction optimization that replaces the first operation with the second operation (e.g., by replacing the operation element $35a'$ or data element $35b'$, or both, of the first node with that of the second node).

As yet another example, the transformation engine 18 may optimize the dataflow graph by combining two or more nodes. For example, the transformation engine 18 may identify separate nodes representing operations that may be executed by different processes running on one or multiple computing devices, and may optimize the dataflow graph by combining the separate nodes and their respective operations into a single node so that all of the operations are performed by a single process executing on a single computing device, which can reduce the overhead of inter-process (and potentially inter-device) communication. The transformation engine 18 may also identify other nodes that can be combined, such as two or more separate join operations that can be combined or a filtering operation that can be combined with a rollup operation, among many other combinations.

In some examples, the transformation engine 18 may identify a node configured to perform several operations that may be more efficient when executed separately, and may perform a serial to parallel optimization of the dataflow graph which breaks one or more of the several operations into separate nodes for parallel processing (e.g., an automatic parallelism operation). The operations may then execute in parallel using different processes running on one or multiple computing devices. The transformation engine 18 can then add a merge operation to merge the result of the parallel operations. Similarly, in some examples the transformation engine 18 may identify points in the dataflow graph containing large chunks of data (e.g., data corresponding to large tables and indices), and may perform a partitioning optimization of the dataflow graph to break the data into smaller partitions (e.g., an automatic partitioning operation). The partitions may then be processed in series or parallel (e.g., by combining the automatic partitioning operation with the automatic parallelism operation). By reducing the size of the data to be processed or by separating operations for parallel processing, or both, the transformation engine 18 can significantly improve the efficiency of the resultant dataflow graph 19.

In some examples, the transformation engine 18 can perform a width-reduction optimization when producing the transformed dataflow graph 19. For example, the transformation engine 18 may identify data (e.g., one or more columns of data) to be deleted at a certain point in the dataflow graph prior to the performance of subsequent operations because that data (e.g., the data to be deleted) is not used in subsequent operations and need not be propagated as part of the processing. As another example, a node in a dataflow graph may be configured to perform several operations, and the results of some of these operations may be unused. Accordingly, the transformation engine 18 may perform a width reduction optimization that removes the unused or otherwise unnecessary data (e.g., by inserting a node to delete the data at the identified point, by replacing a node configured to perform several operations with another node configured to perform only those operations whose results are used, etc.). In this way, the transformation engine 18 optimizes the dataflow graph by reducing the amount of computational resources needed by the dataflow graph to carry data through subsequent operations (e.g., by reducing network, memory, and processing resources utilized).

To identify portions of the dataflow graph (e.g., the dataflow graph 17) to which to apply one or more optimizations, the transformation engine 18 (or another component of the graph generation system 12) may employ a dataflow graph pattern matching language. The dataflow subgraph pattern matching language may include one or more expressions for identifying specific nodes or operations in the dataflow graph for optimization, as described in detail below. For example, the pattern matching language may include expressions for identifying a series of nodes of at least a threshold length (e.g., at least two, three, four, five, etc.) representing a respective series of calculations that could be combined and represented by a single node in the dataflow graph using a combining operations optimization rule. Identifying such patterns may facilitate the application of the combining operations optimization rule described above. A preferred but non-limiting example of one such expression is "A→B→C→D", which may help to identify a series of four consecutive data processing operations which may be combined.

As another example, the pattern matching language may include expressions for identifying portions of the dataflow graph in which certain types of nodes can commute with other nodes to optimize the dataflow graph. This may facilitate the application of multiple different types of optimization rules to the dataflow graph. When a data processing system determines that the order of one or more nodes in the dataflow graph may be altered without changing the processing results, this allows the data processing system to consider changes to the structure of the dataflow graph (as allowed by the degree of freedom available through commuting operations) in order to identify portions to which optimization rules could be applied. As a result of considering commuting-based alterations, one or more optimization rules may become applicable to a portion of a graph to which the rule(s) were otherwise not applicable.

For example, as described above, an optimization rule may involve identifying two adjacent nodes in the initial dataflow graph representing respective sort operations, with the second sort operation nullifying the effect of the first operation such that the first operation is redundant. By definition, such an optimization rule would not be applied to a dataflow graph that does not have adjacent nodes representing sort operations. However, if a first node representing a first sort operation were to commute with one or more other nodes, then it may be possible to change the order of the first node with at least one of the one or more other nodes such that the first node representing the first sort operation is placed adjacent to a second node representing a second sort operation. As a result of commuting nodes in this way, the optimization rule that removes the redundant first sort operation may be applied to the dataflow graph.

Accordingly, in some examples, the pattern matching language may include one or more expressions for identifying subgraphs of a dataflow graph in situations where the order nodes in the dataflow graph may be changed. As one example, the expression "A→( . . . )→B" (where each of A and B may be any suitable data processing operation such as a sort, a merge, etc.) may be used to find a portion of the dataflow graph having a node "A" (e.g., a node representing the operation "A") and node B (representing operation B), and one or more nodes between the nodes A and B with which the node A commutes (e.g., if the order of the nodes is changed, the result of processing performed by these nodes does not change). If such a portion were identified, then the dataflow graph may be changed or optimized by moving node A adjacent to node B to obtain the portion "AB". As a specific example, if a dataflow graph were to have the nodes ACDB, and the operation A were to commute with the operations C and D, then the dataflow graph may be altered to become "CDAB". In turn, the transformation engine 18 may consider whether an optimization rule applies to the portion "AB." For example, if the operation A were a sort and the operation B were a sort, the transformation engine 18 may attempt to determine whether these two sorts may be replaced with a single sort to optimize the dataflow graph.

As another example, the expression "A→( . . . )→B*" may be used to find a portion of the dataflow graph having a node A, a second node B, and one or more nodes between these nodes with which the node B commutes. As a specific example, if a dataflow graph were to have the nodes ACDB, and the operation B were to commute with the operations C and D, then the dataflow graph may be altered or optimized to become "ABCD". In turn, the transformation engine 18 may consider whether an optimization rule applies to the portion "AB."

As another example, the expression "A→( . . . )→B**" may be used to find a portion of the dataflow graph having a node A, a node B, and one or more nodes (e.g., C and D) between the nodes A and B with which node B does not commute. In that case, the system may try to perform a "pushy" commute, where if possible the nodes C and D would be pushed to the left of the node A. As a specific example, if a dataflow graph were to have the nodes ACEDB, and the operation B were to commute with the operation E but not operations C and D, then the dataflow graph may be altered to become "CDABE"—B commuted with E, but pushed C and D to the left of A.

As yet another example, the expression "A**→ ( . . . )→B" may be used to find a portion of the dataflow graph having a node A, a node B, and one or more nodes (e.g., C and D) between the nodes A and B with which node A does not commute. In that case, the system may try to perform a "pushy" commute, where if possible the nodes C and D would be pushed to the right of the node B. As a specific example, if a dataflow graph were to have the nodes ACEDB, and the operation A were to commute with the operation E but not operations C and D, then the dataflow graph may be altered to become "EABCD"—node A commuted with E, but pushed C and D to the right of B.

Generally, the optimization and transformation process is iterative, with each iteration of an optimization or transformation (18*a*) transforming the dataflow graph 17 until a test (18*b*) indicates that no further optimizations or transformations are possible, required, or desired. For example, transformation engine 18 may transform the dataflow graph 17 by: (1) selecting a first optimization rule; (2) identifying a first portion of the dataflow graph 17 to which to apply the first optimization rule; and (3) applying the first optimization rule to the first portion of the dataflow graph 17. Subsequently, the data processing system may determine whether another one or more additional optimizations described here can be applied to the dataflow graph 17 or is necessary to produce the transformed dataflow graph 19 that can be compiled and executed. If additional optimizations are applicable, the transformation engine 18 can continue updating the dataflow graph 17 by: (1) selecting a second optimization rule different from the first optimization rule; (2) identifying a second portion of the dataflow graph 17 to which to apply the second optimization rule; and (3) applying the second optimization rule to the second portion of the dataflow graph 17.

Figure 5:
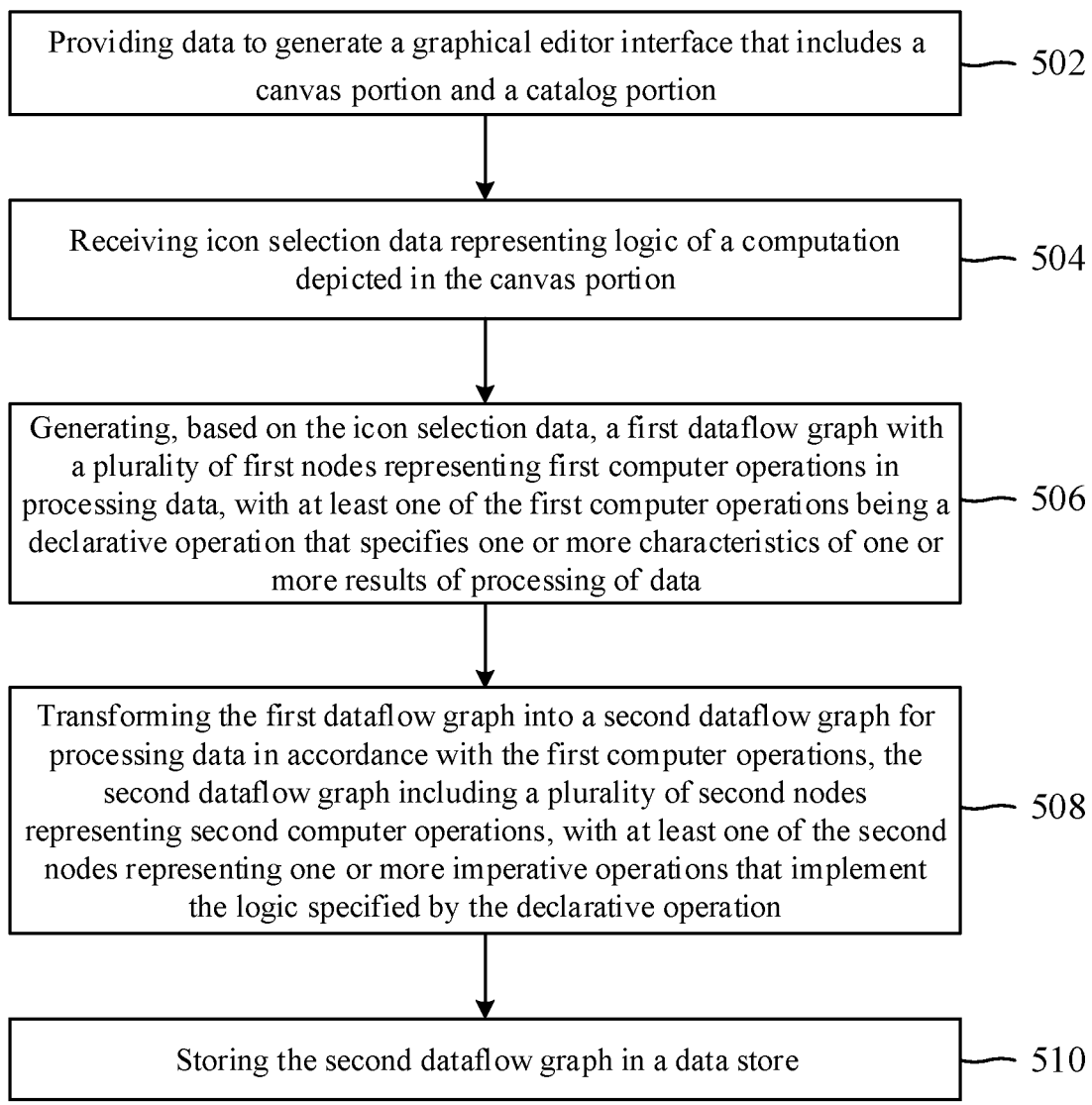
FIG. 5 is a flowchart of an example process for generating a computational dataflow graph.

At the point where there are no further optimizations or transformations, the transformation engine 18 outputs the transformed dataflow graph 19 to the compiler system 22 that compiles the transformed dataflow graph 19 into an executable computational graph (e.g., an executable program 23) that is provided to the data processing system 24 and the storage system 26 for execution and storage FIG. 5 illustrates a flowchart of an example process 500 for generating a computational dataflow graph. The process 500 can be carried out by, for example, one or more components of the system 10.

Operations of the process 500 include providing data to generate a graphical editor interface that includes a canvas portion and a catalog portion, with the catalog portion including one or more selectable icons for visually depicting, in the canvas portion, logic of a computation (502). For example, the catalog portion can include dataset selection icons and transformation selection icons, and each selected icon can represent an instruction to access data from a data catalog that specifies an operation or a data source or sink.

Icon selection data representing logic of a computation depicted in the canvas portion is received (504). The icon selection data can specify at least one of the one or more selectable icons selected from the catalog portion and included in the canvas portion.

Based on the received icon selection data, a first dataflow graph is generated (506). The first dataflow graph includes a plurality of first nodes representing first computer operations in processing data, with at least one of the first computer operations being a declarative operation. In general, a declarative operation is one that specifies one or more characteristics of one or more results of processing of data without necessarily specifying how the results are achieved. The first nodes can represent the logic specified in the canvas portion, with at least one of the first nodes representing a selectable icon selected from the catalog portion. In some implementations, some or all of the first nodes include an operation placeholder field to hold an operation and a data placeholder field to hold a source or sink for data. Generating the first dataflow graph can include retrieving from a storage system elements of the operation held in the operation placeholder field to populate (or modify) the operation placeholder field with the operation (or a link to the operation), and retrieving from the storage system elements of the data source or the data sink held in the data placeholder field to populate (or modify) the data placeholder field with a link pointing to the source or the sink for the data.

In some implementations, a visualization of the first dataflow graph is rendered in, for example, the canvas portion of the graphical editor interface. In some implementations, one or more of the first nodes are labeled to provide labeled nodes. The labels may refer to one or more of keys, values, names, and sources. In some implementations, a visualization of the labeled nodes are rendered in the canvas portion.

The first dataflow graph is transformed into a second dataflow graph for processing data in accordance with the first computer operations (508). The second dataflow graph includes a plurality of second nodes representing second computer operations, with one or more of the second nodes representing one or more imperative operations. In general, an imperative operation is one that specifies (e.g., in a programming language or other machine-readable code) how to implement the logic specified by a declarative operation. The one or more imperative operations are unrepresented by the first nodes in the first dataflow graph. In some implementations, at least one of the second operations represented in the second dataflow graph and unrepresented in the first dataflow graph includes a sort operation, a data type operation, a join operation with a specified key, or a partition operation. In some implementations, at least one of the second operations includes an automatic parallelism operation or an automatic partitioning operation, which may include inserting an automatic parallelism node or automatic partitioning node into the second dataflow graph. In some implementations, at least one of the second operations includes an operation to specify metadata among or between one or more of the second nodes. In some implementations, the first nodes of the first dataflow graph, which may be labeled nodes, are compiled into a second dataflow graph that is a computational dataflow graph. The nodes or the elements stored in the nodes may be optimized.

In some implementations, one or more of the second operations (i) are required for processing data in accordance with one or more of the first operations specified in the first dataflow graph, or (ii) improve processing data in accordance with one or more of the first operations specified in the first dataflow graph, relative to processing data without the one or more additional operations, or both.

In some implementations, the second dataflow graph is transformed into an optimized dataflow graph by applying one or more dataflow graph optimization rules to the second dataflow graph to improve a computational efficiency of the second dataflow graph, relative to a computational efficiency of the second dataflow graph prior to the applying. The dataflow graph optimization rules can include, for example, dead component elimination, early filtering, or record narrowing, among others, as described above in context of FIGS. 4A-D.

The second dataflow graph is stored in a data store (510). In some implementations, the second dataflow graph is compiled by a compiler system to produce a compiled dataflow graph (e.g., an executable program). The compiled dataflow graph can be provided to a data processing system and a storage system for execution and storage.

In some implementations, a prototype node is accessed and an algorithm is applied that copies parameters from the accessed prototype node to modify at least one of the first nodes. At least one parameter of the at least one node can a set parameter that is not overwritten by the prototype node. The prototype node can declare ports on the at least one node or the node itself. In some implementations, the prototype node declares parameters of components presented in the canvas of the editor interface. Applying the prototype may replace descriptors for an existing parameter with the descriptor from the prototype, but may not replace an existing value for a parameter.

Lexical Structure:

A dataflow graph, such as the dataflow graph 17, has a lexical structure. In some implementations, the lexical structure includes symbols, keywords, numbers, strings, code-like strings, and other lexical elements.

Symbols can contain letters, digits, and punctuation (e.g., underscores or periods), with at least one character that is not a punctuation character. Other rules can be adopted in some implementations, such as a rule that the first character of a symbol cannot be a digit.

Keywords can include short symbols containing only lower case letters. A structure (e.g., a data structure) can be developed for all enumerated keywords.

Numbers can be signed integers with arbitrary length. For numbers that are parameter values, a number which is too large to represent (e.g., as an int8) can be transformed to a parameter with a string value instead of a numeric value.

Strings can be quoted with single or double quotes. Within a string, the terminating quote character can be escaped with backslash.

Code-like strings can be quoted with parentheses. Within parentheses, balanced nested parentheses are allowed, as are single- and double-quoted strings. This representation can be used for key specifiers, transforms, metadata, and multiline textual parameter values. Also within parenthesis, consistent indentation is removed during parsing, and re-inserted during serialization, thus being indent embedded data manipulation language (DML) consistent with the graph structure.

Ports, Flows, and Branches:

Ports can be input ports and output ports. Each port has a name (e.g., "in," "out," "reject0"), unless the ports are the default input or output ports for their component, in which case the name may be omitted. Ports have flows. A flow can connect one output port to one input port. Ports have parameters. Ports may be bound to a graph port. For example, input ports can be bound to graph input ports and output ports can be bound to graph output ports.

Flows may be specified separately from nodes, as elements of the graph. Flows may be specified at the top level of a node, indicating a flow into the default input port or specified within an input port.

Flows may be specified implicitly, by putting a sequence of nodes in a branch. Within a branch, the node keyword is not required to introduce a new node. Branches have IDs, and wherever a flow can specify a node by ID, it can specify a branch. A flow from a branch can be from the last node in the branch. A flow to a branch can be to the first node of the branch.

If there is only one flow from a node or a branch, then that node or branch may be specified as part of the flow, nested inside the node that consumes its output.

Graph elements can refer to other elements of the graph. For example, flows can refer to nodes, parameters can refer to other parameters, and key parameters can refer to values, among others. To allow these references, when an element is introduced it can optionally be given an ID. The different element types can have separate ID spaces. In some implementations, IDs are optional, but without an ID an element cannot be referred to.

Parameters:

Parameters can have a name, a value that can be a locator, and an interpretation. The parameter can be a symbol. Parameter names that have a leading punctuation character (e.g., a period) are considered private to the dataflow graph and are not used to generate parameters in other graph models, such as the transformed dataflow graph. Parameter names which start with other character patterns (e.g., two leading periods) are considered to be transient and by default are not saved with the graph. This can be overridden with a command.

Parameters are defined by giving them a value. Parameters values can be translated to a graph parameter as strings, but other forms can be permitted. These other forms are preserved in the internal model and when serializing. In graph algorithms such as deduplication, two parameters may be considered identical if their structural type is the same and their value is the same. In pattern matching, the type of the pattern parameter controls (e.g., the actual parameter being compared against the pattern it is converted to that type). This allows a pattern to assert a true-valued parameter using, for example, "param sorted=true," which matches a node where the parameter "sorted" has the integer value 1 or string value "true" (or any of the other parameter values that would typically be interpreted as "true").

Parameters can be located at a specified location. When generating other graph models, the locator can be preserved. Algorithms which utilize the value of a parameter can resolve the locator path and read the contents of the file.

Graph-level parameters can use a declaration when translating the dataflow graph 17 to other graph models, such as the transformed dataflow graph 19. The declaration has a number of parts (e.g., input or output parameter, parameter type, required parameter, exported parameter, parameter command line interface, parameter read from environment), each of which may have a default state. The declaration defaults can be overridden by providing values for special parameters.

Within a node prototype or a replacement node, parameters may have descriptors. A descriptor can be used to determine what user interface is used for editing a parameter, and what validation is applied to parameter values. In an example, the descriptor is a set of properties immediately after the parameter keyword.

Parameter descriptors can be open-ended in the language. For example, new fields can be used in a prototype file, and recognized in the user interface, without any code change in the implementation. Parameter values are validated against descriptors in the built-in "apply-prototypes" pass, described below, and whenever a replacement occurs.

Reading and Writing Mutable-Graphs:

Dataflow graphs can be read from a file or command-line argument, such as by using a command line utility.

Below is an example of a complete dataflow graph using the lexical structure described herein:

```
node 0 {
    statement 1 [input]
    statement 2 [processing instructions]
    statement 3 [output]
}
node 1 {
    label = "discard trash";
}
flow from node 0 to node 1;
```

Dataflow Graph Prototypes:

A parameter value can appear in a script as an argument rather than as a parameter and does not generate a parameter in other graph models. Instead, this parameter is an instruction to the dataflow graph transformation code to set a component path for the translated component produced. Prototypes allow each node of such a kind to have such a same parameter value.

In some implementations, prototypes are specified as part of a dataflow graph. Prototypes may not be applied immediately so that parsing and serializing the graph makes no change. A built-in algorithm can be provided to copy parameters from prototypes. Parameters, which are already set are not overwritten by the prototype. Common component types used by the translators are enumerated and have names. A mutable utility generates a default set of prototypes for the components. This makes it easier to generate graphs, since fewer parameters need to be specified explicitly.

Prototypes are applied in several circumstances, such as by applying a prototype algorithm, by explicitly calling a prototype routine in code in algorithms that introduce new nodes, or whenever a node is generated by applying a mapping rule.

Prototypes may also be used to declare the nodes, ports, and parameters of components, for use in presenting an editing interface. This use is described in PROTO files, below.

Applying a prototype does not replace an existing value for a parameter. However, applying a prototype does replace the descriptor for an existing parameter with the descriptor from the prototype. This allows information about parameter types to be placed into descriptors, and have this apply to parameter values.

Dataflow Graph Labels:

A node can have zero or more labels. When a component is generated from a node, the labels on the node are sentence-cased and combined to form a component label. When nodes are combined, their label sets may be combined as well. In some implementations, labels can be assigned a priority to help reduce the proliferation of labels and produce a meaningful final label. Labels can be named labels and can refer to sources, keys, or values, among others.

Dataflow Graph Algorithms:

In some implementations, one or more algorithms can be applied to transform or optimize a dataflow graph, including a pattern matching pass, a built-in pass to apply prototypes (described above), a built-in pass to deduplicate, a built-in pass explicit-replicate, and built-in pass to uncross flows, among others.

In some implementations, a dataflow graph algorithm includes a pattern matching pass. The pattern matching pass contains rules; each rule has a pattern and a replacement. A pattern may specify parameter values required for the pattern to match. A pattern may involve more than one node. Node kinds may be wildcarded, although this may be computationally expensive. A replacement may consist of no nodes at all (to remove the matched section of the graph entirely), a single node, or multiple nodes connected by flows. If a wildcard node kind was used in the pattern, then that wildcard is bound to the matched node kind, and may be used in the replacement In some implementations, a dataflow graph algorithm includes a deduplicate pass. The deduplicate pass finds subgraphs that are functionally identical and combines them. Two nodes are considered to be identical if they have no incoming flows or if their incoming flows come from the same nodes, and their parameters match. In some implementations, the outgoing flows do not count when checking nodes for equivalence. Labels may also not count for testing node equivalence.

Two nodes that are folded together in deduplication can collect all of the labels from the input nodes. Deduplication can result in nodes with multiple output flows from a single port. Deduplication can also result in bubbles in the graph, where flows diverge from a single port, then re-converge.

Other algorithms include built-in pass explicit-replicate and built-in pass uncross-flows, as described below.

In some implementations, a dataflow graph algorithm includes an explicit-replicate pass. In a dataflow graph, very few component kinds support multiple flows from an output port. But, the dataflow graph model may allow multiple flows to or from any port. The explicit-replicate pass produces a node with kind "replicate" and no other properties downstream of any port with multiple output flows, and moves the flows to that node. Later pattern matching passes may turn some of these into multi-output reformats.

In some implementations, a dataflow graph algorithm includes an uncross-flows pass. The uncross-flows pass attempts to planarize the graph by re-ordering flows into gather ports and re-numbering input ports on joins. This is a heuristic algorithm since many graphs are not planar.

Dataflow Graph Integration with Dataset Catalogs:

A data source catalog stores metadata about data sources, such as the URL to be used to access data, the record format of the data, sort and partition keys if any, among other data. The dataflow graph 17 can use the catalog of a query instance, or a catalog that has been exported to a catalog interchange format (CIF) file, or embed data source information directly in the graph.

For example, if the system assigns the mutable utility a catalog file, then graphs can refer to data sources in that catalog by name. Having introduced a data source, its properties can be referred to elsewhere in the dataflow graph. Source parameters can be resolved at a later stage when processing a dataflow graph 17 so that it remains clear where a particular parameter value is coming from. This is especially useful when the parameter is large.

Dataflow Graph Extensions:

A dataflow graph can be extended for value-oriented processing and graph semantics. In some implementations, the dataflow graph can be extended through the use of aspects, expression values, built-in passes, vias, gathers, merges, flow unification, and aspect propagation, among others.

An aspect is some information or meta-information that propagates along the flows of a graph. The primary examples are values: a value is computed at one node in a graph, and is available for use at any node further downstream. Other aspects include the set of rows present along a flow (a row set), the order of those rows (an order), and the partition key for parallel data (a partition), among others. The layout of nodes is also propagated by the same mechanism, so layout can be treated as another aspect.

New aspects are introduced with the "new" keyword (which is optional). Values are usually given an ID, so that they can be referenced later; other aspects are singletons—only the most recent is available for reference, so they can be referenced without an ID. An aspect is available to be referenced at nodes downstream of the node or port where it is introduced, up until it is explicitly deleted or (for non-values) replaced.

Aspects are used to model the effect of nodes, so that the system can tell which nodes have any effect, and which nodes might be allowed to be reordered. Values are used in this way, and also to determine metadata on ports and in generating transform functions.

A new expression value may be constructed from a DML expression. The expression can be a constant, or can refer to other values by ID. Expression values are also used to construct values with just the right type for output.

In some implementations, built-in passes can be used to fold common aspects and collapse folds. For example, if a value is computed once and is still alive, then a new value with the same expression is redundant—the existing value can be used instead.

In some implementations, built-in passes can be used to remove empty nodes. For example, a node has "side effects" if it writes to a data source, introduces a new value or other aspect, or ends the lifetime of a value or other aspect with "del." A node with no side effects is considered empty; the pass "remove-empty-nodes" will remove that empty node. Some nodes can be excluded. For example, any node with a "keep-alive" flag set or any node with a port bound to a graph-level port or any node with multiple input flows to a single unify port.

In a graph containing paths that diverge and then re-converge (as in a self-join), it is possible for the same value to arrive a node along multiple paths. At a join, the values along different paths turn into different values. This is done by introducing "via" values, indicating the port on which a value arrived. A via value ends the lifetime of the value it references; any downstream reference uses the via value.

In some implementations, via values are only necessary when there is an ambiguity—a graph which has the shape of a tree should not need via values. The deduplication pass introduces via values, because it introduces re-converging flows.

When multiple flows arrive at a single input port, multiple row sets can be combined into a single row set. Values on the incoming flows are matched up with each other to produce a unified format for the output. If a value arrives along all flows to an input port, then an explicit unify is not needed; the value is visible downstream of the input port as a single value. If a value arrives along only some of the flows to an input port, then it is not visible downstream of the input port.

A new aspect (in particular values) may be introduced at a node or a port. The aspect is then visible downstream of that port, subject to propagation rules. In general, aspects propagate along flows and across bindings to graph-level ports. Aspects introduced at an output port propagate out the flows from that output port. Aspects introduced at a node propagate to all of the output ports of that node, and from there. Aspects introduced at an input port propagate to the node as a whole, and from there to its output ports and down their flows.

As described above with "unify," input ports with multiple incoming flows may allow values to propagate through if they appear on all incoming flows. Yet, error and log ports may be configurable to not propagate data from upstream; these are tagged with "passthrough none." Other ports propagate only from a single input port; these are tagged with that port's name.

Names, Metadata, and Transforms:

Once a dataflow graph has been optimized to provide an optimized dataflow graph, that graph is converted into a transformed dataflow graph (e.g., the transformed dataflow graph 19). To do so, metadata and transforms that compute the values described in the dataflow graph can be identified.

A value may be given a name when it is introduced. Such a name is a hint to use for assigning final value names, but not a requirement; if two values with the same given name are alive across a flow, the system can choose a different name for one of the values. A value name may be locked, indicating that the value has that name when it appears in a record format.

A value may carry a structured comment. When a value with a structured comment is included as a field in a record format, the structured comment for the value is applied to that field. If there is no structured comment directly on the value, and the value is computed by extracting a field from a record where there is a structured comment, then that structured comment is propagated forward.

A built-in pass "assign-names" ensures that every value, which is alive across a flow, has a name and that the names follow certain rules, including: the set of values alive across a flow determines what fields are needed in a record format for that flow; the names of the values are used to determine field names in that record format; two values that are operative across the same flow will have different names; the record formats on multiple flows into a single port (a gather) would be identical; for particular values that unify to a single value at a port, those values will have the same name; values with locked names will retain those names.

In some implementations, the built-in "assign-names" pass can produce an error if locked names prevent any solution. Otherwise, names are assigned, potentially by adding new nodes that introduce new values with the desired names. This pass is relatively late in the order, so that there are fewer flows and narrower sets of values alive across those flows.

A built-in pass "set-metadata" assumes that every value has a name, and assigns a "metadata" parameter to every port in the graph. An attempt is made to enforce similarity of metadata. If the metadata on a port has the same structure and field names as incoming metadata, then the incoming metadata is re-used exactly. If the only difference is that a terminal newline field is dropped, then that field is preserved into the output. If metadata is not the same but some field names from the input appear in the output, then those fields appear first and in their original order. If metadata is an exact structural match for the record format of any data source present in the dataflow graph, then the metadata record format is set to that source's exact metadata string or locator. The built-in pass "set-metadata" pass may introduce other nodes that unify to make the record formats upstream of a gather port identical.

Another built-in pass assumes that every port has metadata, and constructs transforms, packages, and expression-valued parameters from the values at each node.

PROTO Files:

A dialect of the dataflow graph engine has two parts: a presentation layer describing what node kinds are allowed and how nodes are edited, and a compilation layer describing the implementation of each node in terms of lower-level nodes. Prototype files describe the presentation layer of a dialect. A single prototype file can contain multiple prototype sections.

A prototype may be as simple as naming a node kind, such as a node that performs a statistics operation by calling a statistics function.

Node descriptors tell the editor how the node looks and where it should appear in the organizer, for example, by specifying a display name, a description of the node (e.g., "Read from a dataset"), a category to which the node belongs (e.g., "Datasets") and a shape of the node.

Nodes can have input ports and output ports. Mentioning a port in a prototype can cause it to show up in the editor. Each of an input and an output port can be named. Just like nodes, ports can have descriptors that describe various functionality of the port—such as a join.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs (also referred to as a data processing program) (i.e., one or more modules of computer program instructions, encoded on computer storage medium for execution by, or to control the operation of, data processing apparatus). A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices). The subject matter may be implemented on computer program instructions stored on a non-transitory computer storage medium.

The operations described in this specification can be implemented as operations performed by a data processing apparatus on data stored on one or more computer-readable storage devices or received from other sources.

The term "data processing apparatus" encompasses all kinds of apparatus, devices, and machines for processing data including, by way of example: a programmable processor, a computer, a system on a chip, or multiple ones, or combinations, of the foregoing. The apparatus can include special purpose logic circuitry (e.g., an FPGA (field programmable gate array) or an ASIC (application specific integrated circuit)). The apparatus can also include, in addition to hardware, code that provides an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks), however, a computer need not have such devices. Moreover, a computer can be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive)). Devices suitable for storing computer program instructions and data include all forms of non-volatile memory, media and memory devices, including by way of example, semiconductor memory devices (e.g., EPROM, EEPROM, and flash memory devices), magnetic disks (e.g., internal hard disks or removable disks), magneto optical disks, and CD ROM and DVD-ROM disks. The processor and the memory can be supplemented by, or incorporated in, special purpose logic circuitry.

Implementations of the subject matter described in this specification can be implemented in a computing system that includes a back end component (e.g., as a data server), or that includes a middleware component (e.g., an application server), or that includes a front end component (e.g., a user computer having a graphical user interface or a Web browser through which a user can interact with an implementation of the subject matter described in this specification), or any combination of one or more such back end, middleware, or front end components. The components of the system can be interconnected by any form or medium of digital data communication (e.g., a communication network). Examples of communication networks include a local area network (LAN) and a wide area network (WAN), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some implementations, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any implementations or of what may be claimed, but rather as descriptions of features specific to particular implementations. Certain features that are described in this specification in the context of separate implementations can also be implemented in combination in a single implementation. Conversely, various features that are described in the context of a single embodiment can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Other implementations are within the scope of the following claims.

What is claimed is:

1. A computer-implemented method for transforming a first dataflow graph into a second dataflow graph, wherein the first dataflow graph includes a plurality of first nodes representing a plurality of first computer operations, wherein the second dataflow graph includes a plurality of second nodes representing a plurality of second computer operations, and wherein at least some of the second computer operations are unrepresented by the first nodes in the first dataflow graph, including:
    generating the first dataflow graph with the plurality of first nodes representing first computer operations in processing data, with at least one of the first computer operations being a declarative operation that specifies one or more characteristics of one or more results of processing of data;
    identifying a pattern among at least some declarative operations represented in the first dataflow graph;
    based on the pattern identified among at least some of the declarative operations, transforming the first dataflow graph into the second dataflow graph for processing data in accordance with the first computer operations, the second dataflow graph including the plurality of second nodes representing second computer operations, with at least one of the second nodes representing one or more imperative operations that implement the logic specified by the declarative operation, wherein the one or more imperative operations are unrepresented by the first nodes in the first dataflow graph; and
    storing, in a data store, the second dataflow graph.

2. The computer-implemented method of claim 1, wherein transforming the first dataflow graph into the second dataflow graph includes:
    creating the imperative operation; and
    creating a given second node that represents the imperative operation, with the given second node being unrepresented in the first dataflow graph.

3. The computer-implemented method of claim 1, wherein one of the second operations represented in the second dataflow graph and unrepresented in the first dataflow graph is selected from the group consisting of a sort operation, a data type operation, a join operation with a specified key and a partition operation.

4. The computer-implemented method of claim 1, wherein one or more of the second operations at least:
    (i) are required for processing data in accordance with one or more of the first operations specified in the first dataflow graph, or
    (ii) improve processing data in accordance with one or more of the first operations specified in the first dataflow graph, relative to processing data without the one or more additional operations.

5. The computer-implemented method of claim 1, further including:
    transforming the second dataflow graph into an optimized dataflow graph by applying one or more dataflow graph optimization rules to the second dataflow graph to improve a computational efficiency of the second dataflow graph, relative to a computational efficiency of the second dataflow graph prior to the applying.

6. The computer implemented method of claim 5, wherein the one or more dataflow graph optimization rules include at least one of removing a redundant node from the second dataflow graph, removing a dead node from the second dataflow graph, changing an order of nodes in the second dataflow graph, reducing a strength of a node in the second dataflow graph, combining two or more nodes in the second dataflow graph, transforming a node in the second dataflow graph from serial operation to parallel operation, or inserting a partition operation in the second dataflow graph.

7. The computer-implemented method of claim 1, wherein at least one of the second operations includes an automatic parallelism operation or an automatic partitioning operation.

8. The computer-implemented method of claim 1, wherein at least one of the second operations includes a sort operation.

9. The computer-implemented method of claim 1, wherein at least one of the second operations includes an operation to specify metadata among one or more of the second nodes.

10. The computer-implemented method of claim 1, further including:
    providing data to generate a graphical editor interface that includes a canvas portion and a catalog portion, with the catalog portion including one or more selectable icons for visually depicting, in the canvas portion, logic of a computation;
    receiving icon selection data representing logic of a computation depicted in the canvas portion, with the icon selection data specifying at least one of the one or more selectable icons selected from the catalog portion and included in the canvas portion; and
    generating, from the icon selection data received, the first dataflow graph including the plurality of first nodes that represent the logic specified in the canvas portion, with at least one of the first nodes representing the least one of the one or more selectable icons selected from the catalog portion.

11. The computer-implemented method of claim 10, wherein each selected icon represents an instruction to access data from a data catalog that pre-formats data or specifies a format of data that is accessed through the data catalog.

12. The computer-implemented method of claim 1, wherein the first dataflow graph is a user defined dataflow graph.

13. The computer-implemented method of claim 1, further including:
    providing data to generate a graphical editor interface that includes a canvas portion and a catalog portion, with the catalog portion including plural dataset selection icons and plural transformation selection icons;
    generating an initial node in the first dataflow graph in accordance with elements stored in a storage unit represented by a selected dataset selection icon and a selected transformation selection icon;

labeling the initial node to provide a labeled node; and rendering, in the canvas portion, a visual representation of the labeled node.

14. The computer-implemented method of claim 13, wherein the initial node has an operation placeholder field to hold an operation and a data placeholder field to hold a source or sink for data.

15. The computer-implemented method of claim 14, wherein modifying further includes:

retrieving from a storage system elements of the operation held in the operation placeholder field; and retrieving from the storage system elements of the data source or the data sink held in the data placeholder field to populate the data placeholder field with a link pointing to the source or the sink for the data.

16. The computer-implemented method of claim 13, further including:

providing data to render the first data flow graph in the canvas portion of the graphical editor interface.

17. The computer-implemented method of claim 13, wherein upon labeling of all of the initial nodes that were generated, the method further includes:

compiling all labeled nodes of the first dataflow graph into the second dataflow graph that is a computational dataflow graph.

18. The computer-implemented method of claim 13, wherein upon labeling of all of the initial nodes that were modified, the method further includes:

optimizing all labeled nodes of the first dataflow graph, wherein optimizing the labeled nodes of the first dataflow graph further includes optimizing the elements stored in at least one of the labeled nodes.

19. The computer-implemented method of claim 13, further including:

accessing a prototype node; and applying an algorithm that copies parameters from the accessed prototype node to modify at least one of the initial nodes.

20. The computer-implemented method of claim 19, wherein at least one parameter of the initial node is a set parameter that is not overwritten by the prototype node.

21. The computer-implemented method of claim 19, wherein the prototype node declares at least one of the initial node, ports on the initial node, or parameters of components presented in the canvas of the editor interface.

22. The computer-implemented method of claim 19, wherein applying a prototype replaces descriptors for an existing parameter with the descriptor from the prototype but does not replace an existing value for a parameter.

23. The computer-implemented method of claim 13, wherein at least some of the plurality of initial nodes storing one or more elements stored in storage units represented by selected dataset selection icons and storage units represented by selected transformation selection icons at least partially specify corresponding storage unit functions for the at least some of the plurality of initial nodes.

24. The computer-implemented method of claim 13, wherein the labels refer to one or more of keys, values, names, and sources.

25. The computer-implemented method of claim 1, further including:

applying metadata and transforms that compute the values described in the first dataflow graph.

26. The computer-implemented method of claim 1, wherein the transforming is independent of data to be processed by the second dataflow graph.

27. A system for transforming a first dataflow graph into a second dataflow graph, wherein the first dataflow graph includes a plurality of first nodes representing a plurality of first computer operations, wherein the second dataflow graph includes a plurality of second nodes representing a plurality of second computer operations, and wherein at least some of the second computer operations are unrepresented by the first nodes in the first dataflow graph, including:

one or more processors and one or more storage devices storing instructions that are operable, when executed by the one or more processors, to cause the one or more processors to perform operations comprising:

generating the first dataflow graph with the plurality of first nodes representing first computer operations in processing data, with at least one of the first computer operations being a declarative operation that specifies one or more characteristics of one or more results of processing of data;

identifying a pattern among at least some declarative operations represented in the first dataflow graph;

based on the pattern identified among at least some of the declarative operations, transforming the first dataflow graph into the second dataflow graph for processing data in accordance with the first computer operations, the second dataflow graph including the plurality of second nodes representing second computer operations, with at least one of the second nodes representing one or more imperative operations that implement the logic specified by the declarative operation, wherein the one or more imperative operations are unrepresented by the first nodes in the first dataflow graph; and storing, in a data store, the second dataflow graph.

28. The system of claim 27, wherein transforming the first dataflow graph into the second dataflow graph includes:

creating the imperative operation; and creating a given second node that represents the imperative operation, with the given second node being unrepresented in the first dataflow graph.

29. The system of claim 27, wherein one of the second operations represented in the second dataflow graph and unrepresented in the first dataflow graph is selected from the group consisting of a sort operation, a data type operation, a join operation with a specified key and a partition operation.

30. The system of claim 27, wherein one or more of the second operations at least:

(i) are required for processing data in accordance with one or more of the first operations specified in the first dataflow graph, or (ii) improve processing data in accordance with one or more of the first operations specified in the first dataflow graph, relative to processing data without the one or more additional operations.

31. The system of claim 27, further including:

transforming the second dataflow graph into an optimized dataflow graph by applying one or more dataflow graph optimization rules to the second dataflow graph to improve a computational efficiency of the second dataflow graph, relative to a computational efficiency of the second dataflow graph prior to the applying.

32. The system of claim 31, wherein the one or more dataflow graph optimization rules include at least one of removing a redundant node from the second dataflow graph, removing a dead node from the second dataflow graph, changing an order of nodes in the second dataflow graph, reducing a strength of a node in the second dataflow graph, combining two or more nodes in the second dataflow graph, transforming a node in the second dataflow graph from serial operation to parallel operation, or inserting a partition operation in the second dataflow graph.

33. The system of claim 27, wherein at least one of the second operations includes an automatic parallelism operation or an automatic partitioning operation.

34. The system of claim 27, wherein at least one of the second operations includes a sort operation.

35. The system of claim 27, wherein at least one of the second operations includes an operation to specify metadata among one or more of the second nodes.

36. The system of claim 27, where the operations further include:
   providing data to generate a graphical editor interface that includes a canvas portion and a catalog portion, with the catalog portion including one or more selectable icons for visually depicting, in the canvas portion, logic of a computation;
   receiving icon selection data representing logic of a computation depicted in the canvas portion, with the icon selection data specifying at least one of the one or more selectable icons selected from the catalog portion and included in the canvas portion; and
   generating, from the icon selection data received, the first dataflow graph including the plurality of first nodes that represent the logic specified in the canvas portion, with at least one of the first nodes representing the least one of the one or more selectable icons selected from the catalog portion.

37. The system of claim 36, wherein each selected icon represents an instruction to access data from a data catalog that pre-formats data or specifies a format of data that is accessed through the data catalog.

38. The system of claim 27, wherein the first dataflow graph is a user defined dataflow graph.

39. The system of claim 27, where the operations further include:
   providing data to generate a graphical editor interface that includes a canvas portion and a catalog portion, with the catalog portion including plural dataset selection icons and plural transformation selection icons;
   generating an initial node in the first dataflow graph in accordance with elements stored in a storage unit represented by a selected dataset selection icon and a selected transformation selection icon;
   labeling the initial node to provide a labeled node; and
   rendering, in the canvas portion, a visual representation of the labeled node.

40. The system of claim 39, wherein the initial node has an operation placeholder field to hold an operation and a data placeholder field to hold a source or sink for data.

41. The system of claim 40, wherein modifying further includes:
   retrieving from a storage system elements of the operation held in the operation placeholder field; and
   retrieving from the storage system elements of the data source or the data sink held in the data placeholder field to populate the data placeholder field with a link pointing to the source or the sink for the data.

42. The system of claim 39, wherein the operations further include:
   providing data to render the first data flow graph in the canvas portion of the graphical editor interface.

43. The system of claim 39, wherein upon labeling of all of the initial nodes that were generated, the operations further include:
   compiling all labeled nodes of the first dataflow graph into the second dataflow graph that is a computational dataflow graph.

44. The system of claim 39, wherein upon labeling of all of the initial nodes that were modified, the operations further include:
   optimizing all labeled nodes of the first dataflow graph, wherein optimizing the labeled nodes of the first dataflow graph further includes optimizing the elements stored in at least one of the labeled nodes.

45. The system of claim 39, wherein the operations further include:
   accessing a prototype node; and
   applying an algorithm that copies parameters from the accessed prototype node to modify at least one of the initial nodes.

46. The system of claim 45, wherein at least one parameter of the initial node is a set parameter that is not overwritten by the prototype node.

47. The system of claim 45, wherein the prototype node declares at least one of the initial node, ports on the initial node, or parameters of components presented in the canvas of the editor interface.

48. The system of claim 45, wherein applying a prototype replaces descriptors for an existing parameter with the descriptor from the prototype but does not replace an existing value for a parameter.

49. The system of claim 39, wherein the labels refer to one or more of keys, values, names, and sources.

50. The system of claim 39, wherein at least some of the plurality of initial nodes storing one or more elements stored in storage units represented by selected dataset selection icons and storage units represented by selected transformation selection icons at least partially specify corresponding storage unit functions for the at least some of the plurality of initial nodes.

51. The system of claim 27, where the operations further include:
   applying metadata and transforms that compute the values described in the first dataflow graph.

52. The system of claim 27, wherein the transforming is independent of data to be processed by the second dataflow graph.

53. A non-transitory computer readable medium storing instructions for causing a computing system to:
   generate a first dataflow graph with a plurality of first nodes representing first computer operations in processing data, with at least one of the first computer operations being a declarative operation that specifies one or more characteristics of one or more results of processing of data;
   identify a pattern among at least some declarative operations represented in the first dataflow graph;
   based on the pattern identified among at least some of the declarative operations, transform the first dataflow graph into a second dataflow graph for processing data in accordance with the first computer operations, the second dataflow graph including a plurality of second nodes representing second computer operations, with at least one of the second nodes representing one or more imperative operations that implement the logic specified by the declarative operation, wherein the one or more imperative operations are unrepresented by the first nodes in the first dataflow graph; and store, in a data store, the second dataflow graph.

54. The non-transitory computer readable medium of claim 53, wherein transforming the first dataflow graph into the second dataflow graph includes:
creating the imperative operation; and
creating a given second node that represents the imperative operation, with the given second node being unrepresented in the first dataflow graph.

55. The non-transitory computer readable medium of claim 53, wherein one of the second operations represented in the second dataflow graph and unrepresented in the first dataflow graph is selected from the group consisting of a sort operation, a data type operation, a join operation with a specified key and a partition operation.

56. The non-transitory computer readable medium of claim 53, wherein one or more of the second operations at least:
(i) are required for processing data in accordance with one or more of the first operations specified in the first dataflow graph, or
(ii) improve processing data in accordance with one or more of the first operations specified in the first dataflow graph, relative to processing data without the one or more additional operations.

57. The non-transitory computer readable medium of claim 53, wherein the operations further include:
transforming the second dataflow graph into an optimized dataflow graph by applying one or more dataflow graph optimization rules to the second dataflow graph to improve a computational efficiency of the second dataflow graph, relative to a computational efficiency of the second dataflow graph prior to the applying.

58. The non-transitory computer readable medium of claim 57, wherein the one or more dataflow graph optimization rules include at least one of removing a redundant node from the second dataflow graph, removing a dead node from the second dataflow graph, changing an order of nodes in the second dataflow graph, reducing a strength of a node in the second dataflow graph, combining two or more nodes in the second dataflow graph, transforming a node in the second dataflow graph from serial operation to parallel operation, or inserting a partition operation in the second dataflow graph.

59. The non-transitory computer readable medium of claim 53, wherein at least one of the second operations includes an automatic parallelism operation or an automatic partitioning operation.

60. The non-transitory computer readable medium of claim 53, wherein at least one of the second operations includes a sort operation.

61. The non-transitory computer readable medium of claim 53, wherein at least one of the second operations includes an operation to specify metadata among one or more of the second nodes.

62. The non-transitory computer readable medium of claim 53, wherein the operations further include:
providing data to generate a graphical editor interface that includes a canvas portion and a catalog portion, with the catalog portion including one or more selectable icons for visually depicting, in the canvas portion, logic of a computation;
receiving icon selection data representing logic of a computation depicted in the canvas portion, with the icon selection data specifying at least one of the one or more selectable icons selected from the catalog portion and included in the canvas portion; and
generating, from the icon selection data received, the first dataflow graph including the plurality of first nodes that represent the logic specified in the canvas portion, with at least one of the first nodes representing the least one of the one or more selectable icons selected from the catalog portion.

63. The non-transitory computer readable medium of claim 62, wherein each selected icon represents an instruction to access data from a data catalog that pre-formats data or specifies a format of data that is accessed through the data catalog.

64. The non-transitory computer readable medium of claim 53, wherein the first dataflow graph is a user defined dataflow graph.

65. The non-transitory computer readable medium of claim 53, wherein the operations further include:
providing data to generate a graphical editor interface that includes a canvas portion and a catalog portion, with the catalog portion including plural dataset selection icons and plural transformation selection icons;
generating an initial node in the first dataflow graph in accordance with elements stored in a storage unit represented by a selected dataset selection icon and a selected transformation selection icon;
labeling the initial node to provide a labeled node; and
rendering, in the canvas portion, a visual representation of the labeled node.

66. The non-transitory computer readable medium of claim 65, wherein the initial node has an operation placeholder field to hold an operation and a data placeholder field to hold a source or sink for data.

67. The non-transitory computer readable medium of claim 66, wherein modifying further includes:
retrieving from a storage system elements of the operation held in the operation placeholder field; and
retrieving from the storage system elements of the data source or the data sink held in the data placeholder field to populate the data placeholder field with a link pointing to the source or the sink for the data.

68. The non-transitory computer readable medium of claim 65, further including:
providing data to render the first data flow graph in the canvas portion of the graphical editor interface.

69. The non-transitory computer readable medium of claim 65, wherein upon labeling of all of the initial nodes that were generated, the operations further include:
compiling all labeled nodes of the first dataflow graph into the second dataflow graph that is a computational dataflow graph.

70. The non-transitory computer readable medium of claim 65, wherein upon labeling of all of the initial nodes that were modified, the operations further include:
optimizing all labeled nodes of the first dataflow graph, wherein optimizing the labeled nodes of the first dataflow graph further includes optimizing the elements stored in at least one of the labeled nodes.

71. The non-transitory computer readable medium of claim 65, wherein the operations further include:
accessing a prototype node; and
applying an algorithm that copies parameters from the accessed prototype node to modify at least one of the initial nodes.

72. The non-transitory computer readable medium of claim 71, wherein at least one parameter of the initial node is a set parameter that is not overwritten by the prototype node.

73. The non-transitory computer readable medium of claim 71, wherein the prototype node declares at least one of the initial node, ports on the initial node, or parameters of components presented in the canvas of the editor interface.

74. The non-transitory computer readable medium of claim 71, wherein applying a prototype replaces descriptors for an existing parameter with the descriptor from the prototype but does not replace an existing value for a parameter.

75. The non-transitory computer readable medium of claim 65, wherein the labels refer to one or more of keys, values, names, and sources.

76. The non-transitory computer readable medium of claim 65, wherein at least some of the plurality of initial nodes storing one or more elements stored in storage units represented by selected dataset selection icons and storage units represented by selected transformation selection icons at least partially specify corresponding storage unit functions for the at least some of the plurality of initial nodes.

77. The non-transitory computer readable medium of claim 53, wherein the transforming is independent of data to be processed by the second dataflow graph.

78. The non-transitory computer readable medium of claim 53, wherein the operations further include:
applying metadata and transforms that compute the values described in the first dataflow graph.

* * * * *

UNITED STATES PATENT AND TRADEMARK OFFICE
CERTIFICATE OF CORRECTION

PATENT NO. : 11,593,380 B2
APPLICATION NO. : 16/862821
DATED : February 28, 2023
INVENTOR(S) : Ian Schechter and Garth Dickie It is certified that error appears in the above-identified patent and that said Letters Patent is hereby corrected as shown below:

In the Claims

Column 28, Line 13, Claim 6, delete "computer implemented" and insert -- computer-implemented --

Column 28, Line 49, Claim 10, delete "least" and insert -- at least --

Column 31, Line 31, Claim 36, delete "least" and insert -- at least --

Column 34, Line 4, Claim 62, delete "least" and insert -- at least --

Signed and Sealed this
Fourth Day of July, 2023

Katherine Kelly Vidal
*Director of the United States Patent and Trademark Office*